United States Patent [19]

Kawamura et al.

[11] 4,364,647

[45] Dec. 21, 1982

[54] CONTROL DEVICE FOR A CAMERA

[75] Inventors: Masaharu Kawamura, Hino; Nobuaki Sakurada, Yokohama; Nobuhiko Shinoda, Tokyo; Tadashi Ito, Yokohama; Fumio Ito, Yokohama; Hiroyashu Murakami, Tokyo, all of Japan

[73] Assignee: Canon Kabushiki Kaisha, Tokyo, Japan

[21] Appl. No.: 970,237

[22] Filed: Dec. 18, 1978

Related U.S. Application Data

[63] Continuation of Ser. No. 772,316, Feb. 25, 1977, abandoned.

[30] Foreign Application Priority Data

Mar. 4, 1976 [JP] Japan ..................... 51-23500

[51] Int. Cl.³ .................. G03B 1/18; G03B 17/24; G03B 17/40
[52] U.S. Cl. .................. 354/23 D; 354/106; 354/173; 354/266; 307/600; 346/107 A
[58] Field of Search ............ 354/23 D, 105, 173, 354/289, 50, 51, 106, 75, 76, 109, 238, 258, 266–268, 217, 218; 352/84, 175, 121, 137, 169, 178; 346/107 A, 107 UP; 340/141.4, 31 C; 307/480, 590, 592, 597, 600, 602, 603, 606

[56] References Cited

U.S. PATENT DOCUMENTS

| | | | |
|---|---|---|---|
| 3,386,364 | 6/1968 | Hayden | 354/23 D X |
| 3,434,405 | 3/1969 | Friedman | 354/51 |
| 3,594,747 | 7/1971 | Cronin | 354/75 X |
| 3,664,247 | 5/1972 | Tellerman | 354/76 X |
| 3,842,587 | 10/1974 | Strauss et al. | 354/23 D X |
| 4,001,846 | 1/1977 | Kayneckas | 354/105 |
| 4,015,198 | 3/1977 | Iwashita et al. | 354/173 X |
| 4,021,826 | 5/1977 | Iwata et al. | 354/173 X |
| 4,053,909 | 10/1977 | Shinoda et al. | 354/105 |
| 4,054,888 | 10/1977 | Kozuki et al. | 354/173 X |

Primary Examiner—L. T. Hix
Assistant Examiner—William B. Perkey
Attorney, Agent, or Firm—Toren, McGeady & Stanger

[57] ABSTRACT

The present invention relates to a control device for camera, so designed as to sequentially control the photographing period, the release time and the release frequency in an automatic way and to print the data information on the film. The eventual abrupt change of photographic conditions is detected so as to carry out the releasing independently of the sequential control, stopping the sequential control and automatically controlling the starting time or the determination time of the sequential control.

21 Claims, 26 Drawing Figures

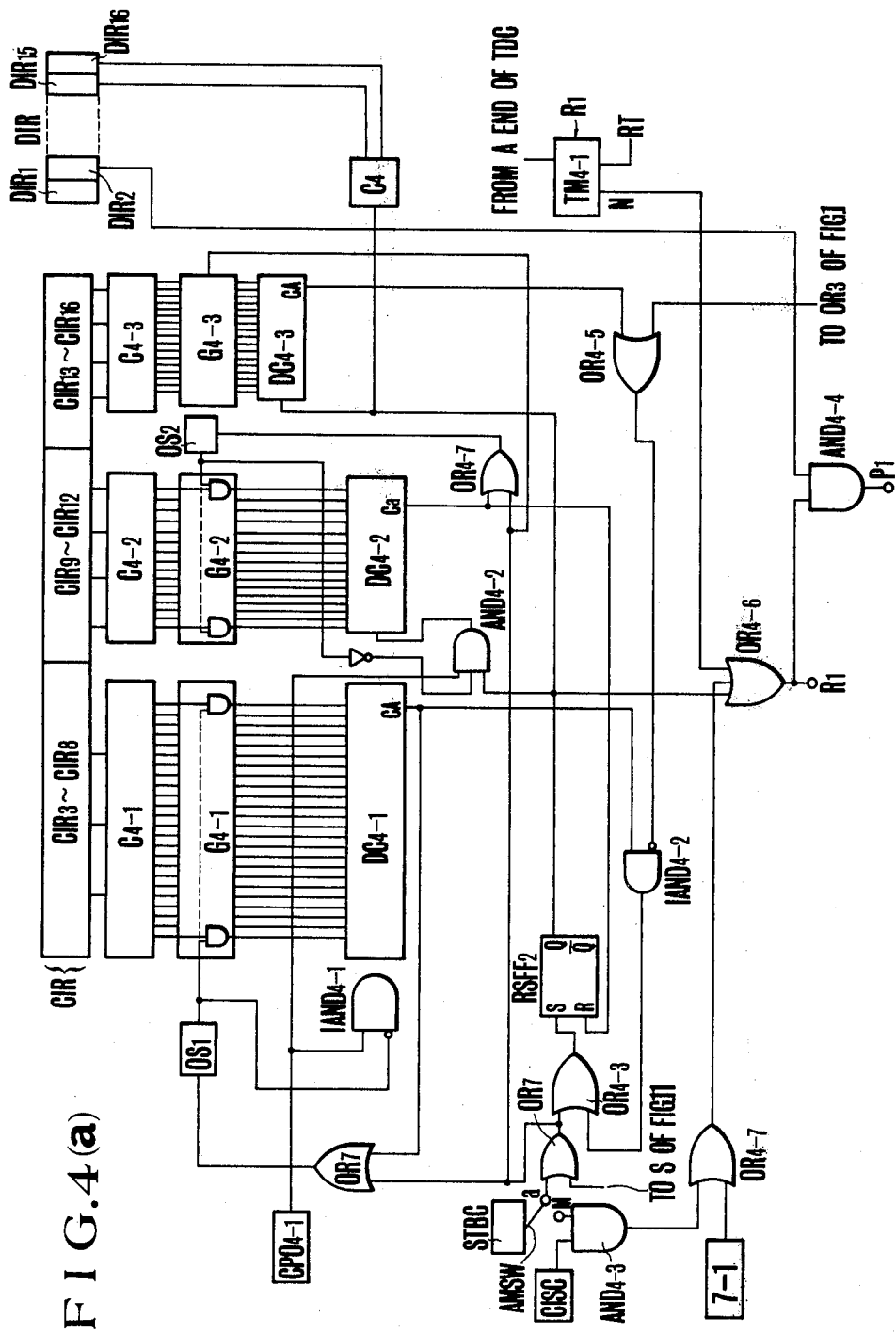
F I G. 4 (a)

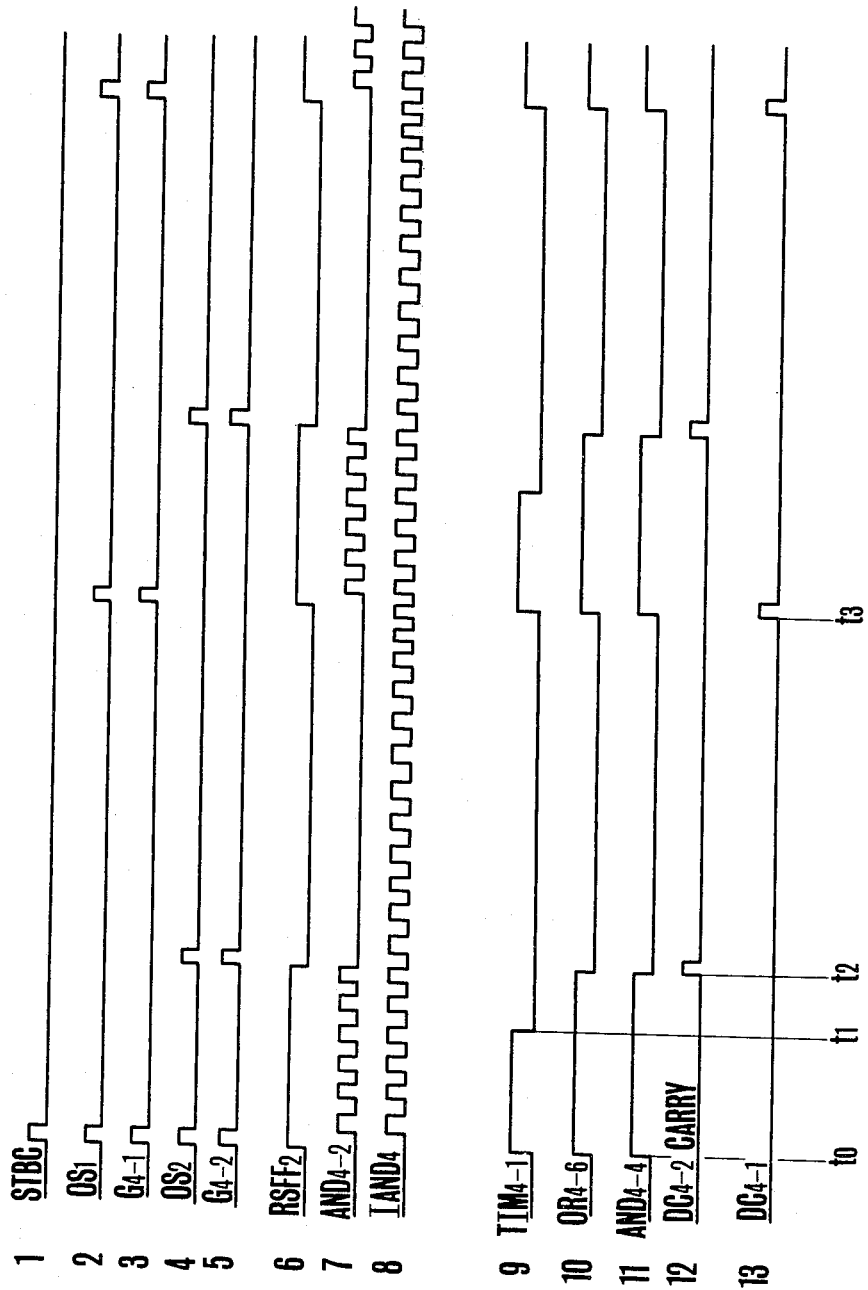

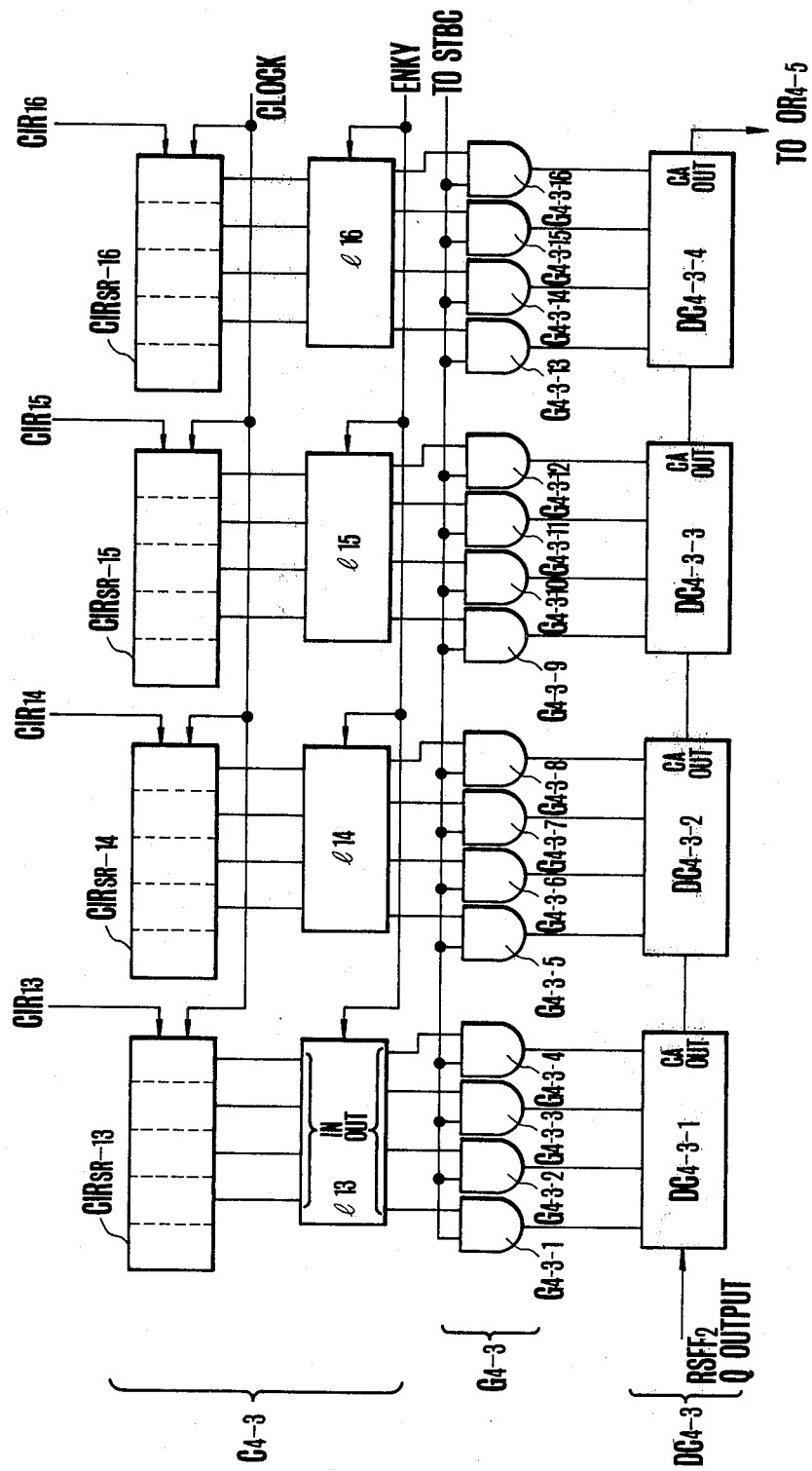

FIG. 7 (b)
(1) CP 
(2) P₁ 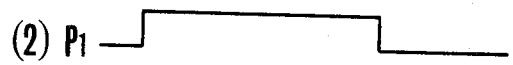
(3) Q_A 
(4) P₁ 
    t₁
(5) P₂ 
    t₂
(6) Q_A 
    t₃
(7) Q_B 
(8) P₁ 
(9) P₂ 
(10) P₃ 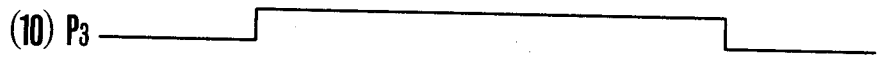
(11) Q_A 
(12) Q_B 
(13) Q_C 

F I G.10
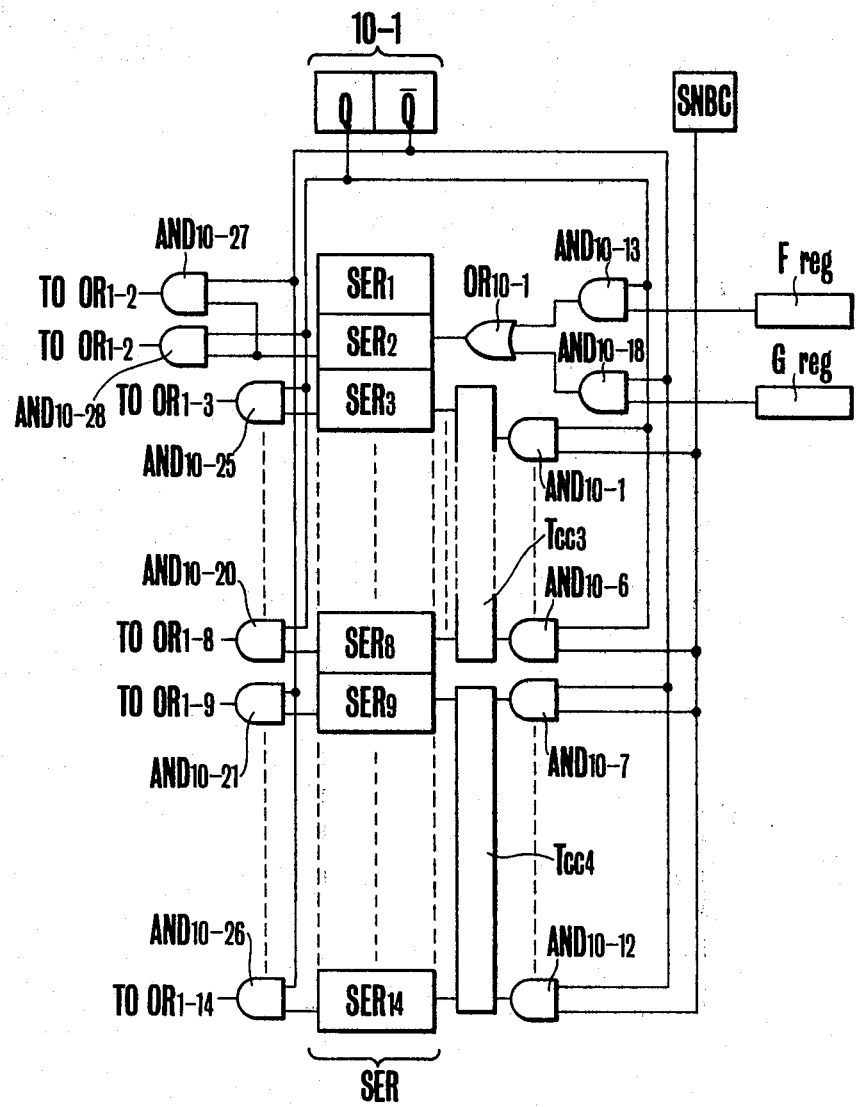

F I G.12 (a)
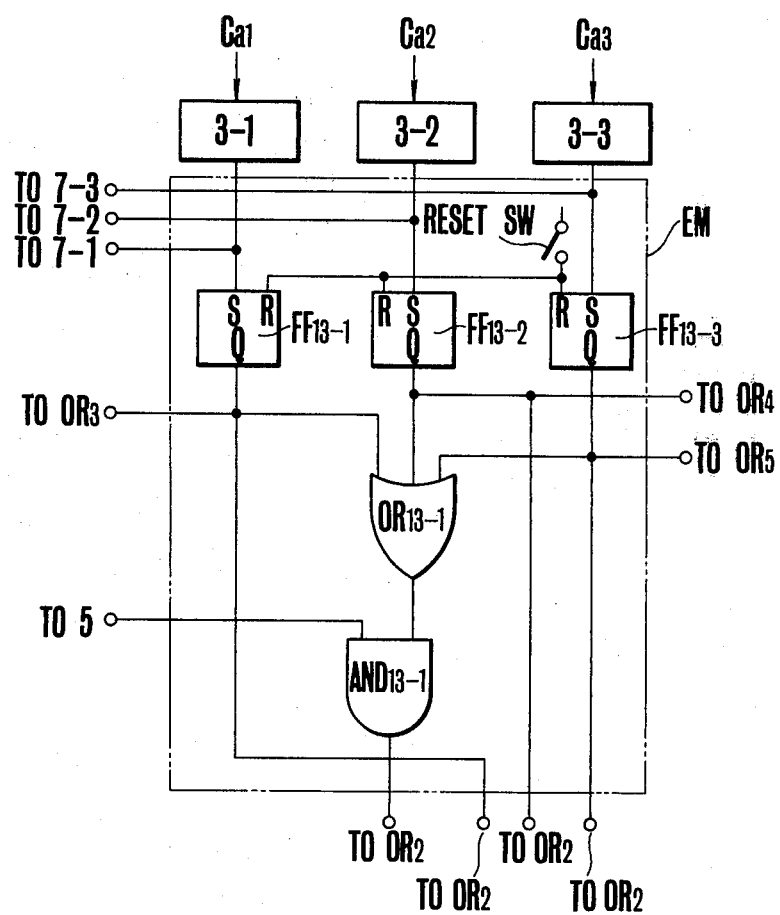

CONTROL DEVICE FOR A CAMERA

This is a continuation of application Ser. No. 772,316, filed Feb. 25, 1977, now abandoned.

FIELD OF INVENTION

The present invention relates to a control device for a camera and, particularly for controlling the photographic sequence such as the photographing period, the photographing time (the number of pictures) and the photographing frequency while at the time of photographing the desired information is printed on the film in such a manner that a number of efficient functions can be combined in a synergistic and logical way.

DESCRIPTION OF PRIOR ART

Generally speaking, a camera needs to be used as a recording medium for various purposes. A conventional camera ordinarily has only a function or ordinary one frame photography and a function of continuous photography using a motor drive device. Thus, it does not fully satisfy the functional requirement as such recording medium.

That is, a function of a camera as a recording medium requires, for example, in photography for research purposes, that photography be conducted at every predetermined cycle for a prescribed number of times. In such case, a camera is sometimes required to have a function where release action is performed repeatedly at every predetermined interval of time for a predetermined number of times. Also, it sometimes is necessary to conduct photography of some number of frames continuously for a predetermined length of time in these repeated release operations. A conventional camera has not been able to satisfy these functional requirements for these purposes.

In photography for research purposes, data is required to be printed on a film surface every time a picture is taken, and in such case the function of printing data at every photo-taking is necessary in addition to the above-mentioned function.

Further, when a camera is used for traffic surveillance and astronomical observation, there is a requirement that photography is performed automatically from a given time till another given time, for example, from 22:00 hour till 05:00 hour of the next day for astronomical observation. This means that a camera must have the function that photography starting time and completing time are set and photography is started automatically at said starting time and is completed automatically at said completing time. Also, a camera for research purposes requires the additional function that, besides the above-mentioned function of photography with a predetermined cycle, whenever a condition of photographing object changes, a photograph is made immediately without any relationship with said predetermined cycle. However, as mentioned above, a conventional camera does not have these functions and these photographic requirements cannot be satisfied.

SUMMARY OF INVENTION

A purpose of the present invention is to offer a control circuit for camera for controlling the photographing operation of a camera with an optional photographing period, time and frequency.

Another purpose of the present invention is to offer a control device for a camera for controlling the photographing operation of camera with an optional photographing period, time and frequency and for printing the desired data on the film.

A further purpose of the present invention is to offer a control device for a camera for automatically controlling the starting and the determination time of the photographing by the camera.

A still further purpose of the present invention is to offer a control device for a camera for automatically photographing by detecting the change of the photographic conditions such as the temperature, the sound and so on.

Still another purpose of the present invention is to offer a control device for camera for sequentially controlling the photographing by a plural number of cameras.

The present invention will be more clearly understood from the following description in reference to the attached drawings.

BRIEF DESCRIPTION OF DRAWINGS

FIG. 4(a) shows a circuit diagram of an embodiment of the control circuit $M_1$ shown in FIG. 1.

FIG. 4(b) shows timing charts for explaining the operation of the control circuit shown in FIG. 4(a).

FIG. 4(c) shows a circuit diagram of an embodiment of the converter $C_{4-3}$, the gate $G_{4-3}$ and the counter $DC_{4-3}$ shown in FIG. 4(a).

FIG. 10 shows a circuit diagram of an embodiment of the register SER shown in FIG. 1 and the data input circuit of the register SER.

DESCRIPTION OF THE PREFERRED EMBODIMENTS

Below, the control device for a camera in accordance with the present invention will be explained.

Figure 1:
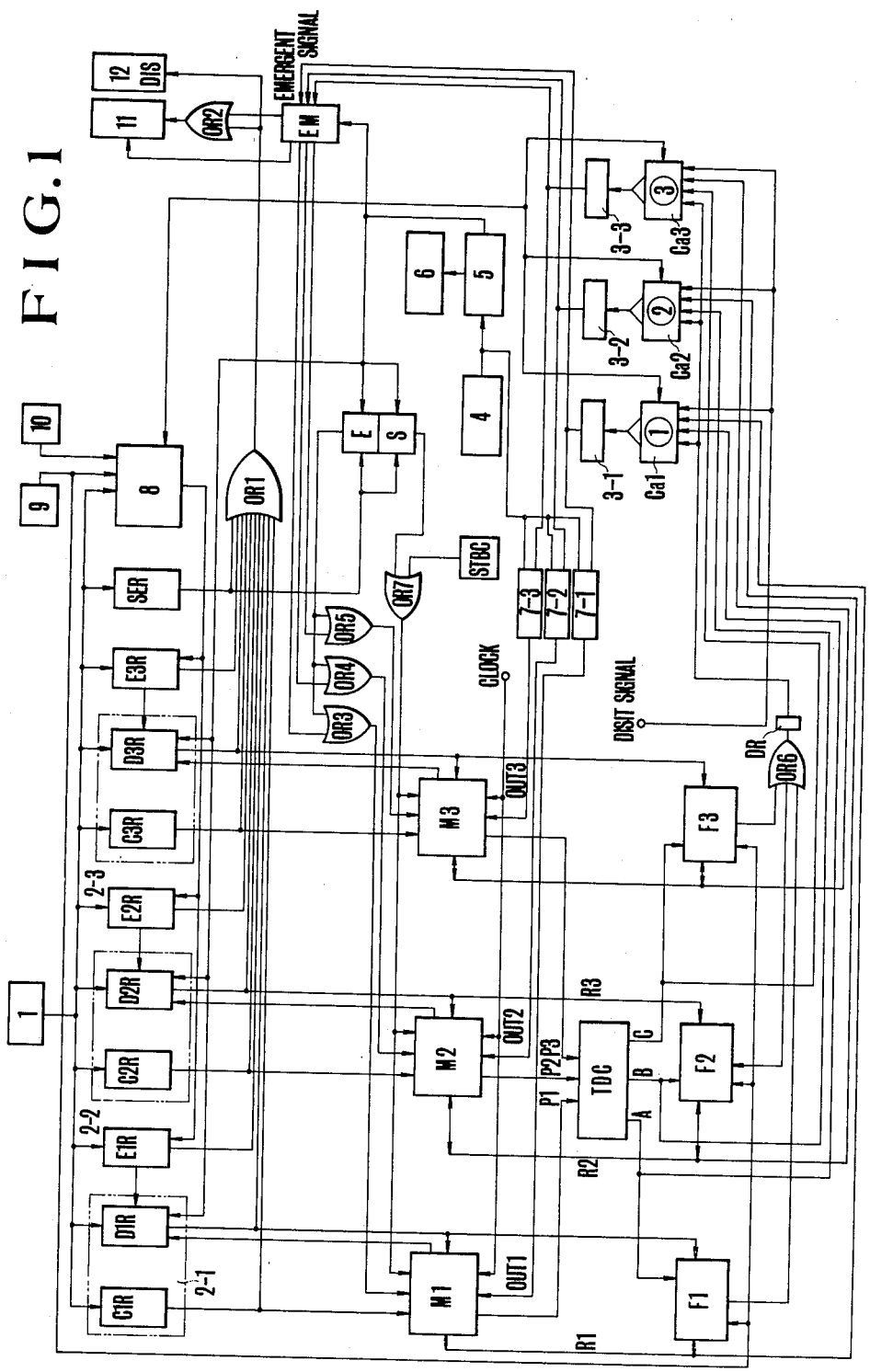
FIG. 1 shows a block diagram of an embodiment of the control device for a camera in accordance with the present invention.

FIG. 1 shows a block diagram of an embodiment of the control device for a camera in accordance with the present invention, whereby 1 is the information input device including the key input button for selectively setting the information for controlling the photographing such as frequency of repeated photographing, the photographing time in the control device or for determining the mode for printing the set data. The control device for a camera is controlled in accordance with the control mode determined by the information input device 1. 2-1-2-3 are respectively an input information memory circuit including a register for memorizing the information from the information input device, a gate for transferring the information to the register. C1R, C2R and C3R are respectively a register for memorizing the information for sequence control of photography such as the frequency of repeated photography and the photographing time. D1R, D2R and D3R are respectively a register for memorizing information to be printed on the film in the camera. M1-M3 are respectively a control circuit for controlling the frequency of repeated photography by each camera, the photographing time in accordance with the information memorized by 2-1-2-3 and the timing of printing the information memorized by the register D1R-D3R in the film. TDC is the printing operation control circuit for producing a printing signal for driving the display element, such as the seven-segments serving as the light source for data printing in each camera. This is done in accordance with the information printing timing controlled by means of the control circuits M1-M3, F1-F3 are respectively a printing information transfer circuit for transferring the information from the register D1R-D3R to the display element in each camera in response to the signal from the printing operation control circuit TDC and 3-1-3-3 are respectively a sensor connected to the camera Ca1-Ca3. Each sensor serves to detect eventual irregularity of the operation of the corresponding camera so as to stop the control operation of the control device or to detect abrupt change, for example, of the object brightness so as to take a photograph independent of the photographic frequency determined by means of the information input device. EM is the abnormal signal forming circuit for forming a signal for stopping the operation of the control circuit M1-M3 in response to the signal produced by the sensor 3-1-3-3 when an irregularity takes place in the operation of a camera. SER is the operation time information memory circuit including the register for setting the operation start time and the operation stop time of the control device M1-M3, in advance being selectively supplied with the information of the operation start time and the operation stop time from the information input device 1. S is the operation start control circuit connected to the register of the operation time information memory circuit so as to control the operation start time of the control device in accordance with the operation start time information, whereby the output of the operation start control circuit is connected to the control circuit M1-M3 through the OR gate OR7. E is the operation stop control circuit connected to the register of the operation time information memory circuit for controlling the operation stop time of the control device in accordance with the operation stop time information set in advance. 4 is the external control unit for controlling the operation start control circuit and the operation stop control circuit in accordance with the output of the measuring circuit (such as digital clock) or for controlling the release operation of each camera independently of the photographing frequency determined with the information input device 1. 5 is the register connected to the external control unit for memorizing the output of the measuring instrument of the external control unit while 6 is the display device for displaying the content of the register 5. 7-1-7-3 are respectively a break-into photography control circuit connected to the sensor 3-1, 3-2 and 3-3 and the external control unit for detecting their outputs in such a manner that, in accordance with the state of their outputs, the release signal is transferred to the control circuit M1-M3. 8 is the operation circuit for obtaining the shutter time information and the aperture value information for a proper exposure and for operating on the aperture value information, the shutter time information, the film sensitivity information and the object brightness information from the ASA dial 9, the light measuring circuit 10 and the information input device. E1R-E3R are respectively a register for memorizing the output of the operation circuit 8, whereby the registers are respectively connected to the film printing information memory register D1R-D3R in such a manner that the contents of the register E1R-E3R are selectively transferred to D1R-D3R for printing the shutter time and the aperture value on the film. 11 is the printer circuit for printing the information displayed with the display circuit 12. The display circuit 12 is connected to the registers C1R-C3R, D1R-D3R, E1R-E3R for displaying the content of each register selectively. OR1-OR7 are respectively an OR gate for transferring the signals from circuit to circuit.

Figure 2:
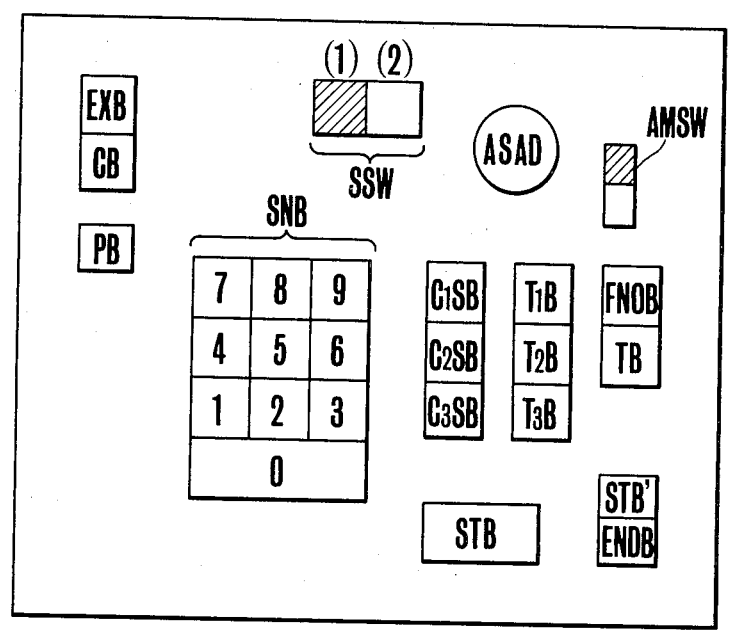
FIG. 2 shows the key board of the information input device shown in FIG. 1.

FIG. 2 shows the key board of the information input device 1 shown in FIG. 1. C1SB-C2SB are the key buttons for selecting the camera Ca1-Ca3. T1B is the key button for delivering the information of the photographing period to the register C1R-C3R. T2B is the key button for delivering the information of the photographing time to the register C1R-C3R. T3B is the key button for delivering the information of the photographing frequency to the register C1R-C3R. EXB is the key button for selecting the exposure control mode for delivering the information of the exposure control operation to the register E1R-E3R. PB is the key button for selecting the data printing mode. STB is the key button for starting the control device in accordance with the present invention. CB is the key button for selecting the control mode in accordance with the information from the external control unit STB' is the key button for setting the operation start information of the control device in accordance with the present invention. ENDB is the key button for setting the operation termination information of the control device in accordance with the present invention FNOB is the key button for putting in the aperture information at the time of exposure control TB is the key button for entering in the shutter time information at the time of exposure control. ASAD is the dial for setting the film sensitivity information. AMSW is the switch for determining the auto-manual mode of the sequence control by the control device in accordance with the present invention. SSW is the switch for controlling the information input gate of the register D1R–D3R and SNB is the number setting key button for setting the desired numerical value information.

Figure 3A:
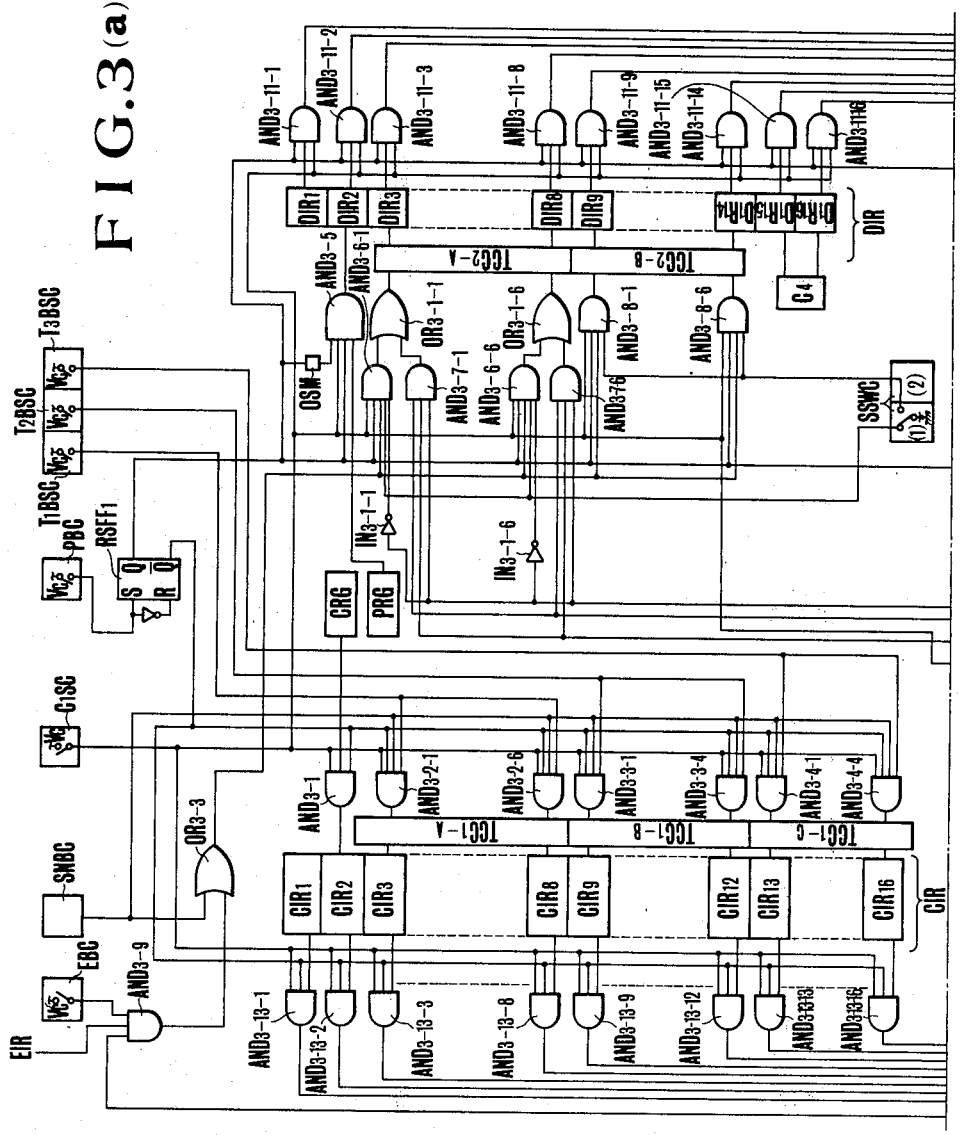
FIGS. 3(a) and (b) show an embodiment of the input information memory circuit shown in FIG. 1.

FIG. 3(a) and (b) (hereinafter called simply FIG. 3) show a circuit diagram of an embodiment of the input information memory circuit 2-1 shown in FIG. 1. C1R is the register for memorizing the information for the sequence control of the photographing with the camera Ca1. In the register, the 4-bit registers $C1R_1$–$C1R_{16}$ are connected in parallel to each other, whereby each 4-bit register represents a figure such that the register C1R is one of 16 figures each with four bits. In each bit of register $C1R_1$ in the register C1R, a binary digital value of "0001" is always stored. In the present embodiment, "0,0,0,1" of $C1R_1$ is the digital value for representing the camera Ca1. Further, $C1R_2$ is the register for producing the operation mode in accordance with the present invention and is always connected to the register CRG of 4 bits storing a binary digital value "1, 0, 1, 0", representing the sequence control mode so as to be supplied with the digital value "1, 0, 1, 0" from the register CRG. The registers $C1R_2$–$C1R_8$ are those for storing the photographing period, being successively supplied with the information of the photographing period through the AND gates $AND_{3-2-1}$–$AND_{3-2-6}$ respectively connected to the registers $C1R_3$–$C1R_8$. The registers $C1R_9$–$C1R_{12}$ for storing the photographing time, namely the information of the time for supplying current to the release circuit of the camera and are supplied with the information of the photographing time through the AND gates $AND_{3-2-1}$– $AND_{3-3-4}$ respectively connected to the register $C1R_9$–$C1R_{12}$. $C1R_{13}$–$C1R_{16}$ are the registers for storing the photographing frequency at the photographing time repeated with the photographing period and are supplied with the information of the photographing frequency through the AND gates $AND_{3-4-1}$–$AND_{3-4-4}$ respectively connected to the registers $C1R_{13}$–$C1R_{16}$. The one input terminal of each AND gate $AND_{3-4-1}$–$AND_{3-4-4}$ is connected to the switching circuit C1SC producing the logic output "1" in functional engagement with the operation of the key C1SB shown in FIG. 2 for selecting the camera Ca1. The other input terminal of $AND_{3-1}$ is connected to the register CRG and the Q output of RS, Flip-Flop $RSFF_1$. The other input terminal of $AND_{3-2-1}$–$AND_{3-2-6}$ is connected to the Q output terminal of $RSFF_1$, the switching circuit T1BSC for producing the logic value "1" in functional engagement with the operation of the key button T1B shown in FIG. 2 for supplying the information of the photographing period and the number setting circuit SNBC for producing a binary digital value corresponding to the numerical value chosen in functional engagement with the operation of the number setting key SNB shown in FIG. 2. The other input terminal of $AND_{3-3-1}$–$AND_{3-3-4}$ is connected to the Q output of $RSFF_1$, the number setting circuit SNDC and the switching circuit for producing the logic value "1" in functional engagement with the operation of the key button T2B shown in FIG. 2 for inputting the information of the photographing time. The other input terminal of $AND_{3-4-1}$–$AND_{3-4-4}$ is connected to the Q output of $RSFF_1$, the number setting circuit SNBC and the circuit T3BBC for producing the logic value "1" in functional engagement of the key button T3B shown in FIG. 2 for setting the photographing frequency.

D1R is the register for storing the printing information for the camera Ca1, including 16 registers $D1R_1$–$D1R_{16}$ of four bits connected in parallel to one another in the same way as in the case of the register C1R so as to constitute a register of sixteen figures with four bits. $D1R_1$ of the register for representing the figure of the register D1R always stores the binary digital value "0,0,0,1". Further the register $D1R_2$ is always connected to the register PRG of four bits storing the binary digital value "1, 0, 1, 1" representing the data printing mode through the AND gate $AND_{3-3}$. $OR_{2-1-1}$–$OR_{2-1-6}$ are the OR gates for putting the information to the register $D1R_2$–$D1R_6$. The input terminal of the OR gate $OR_{3-1-1}$–$OR_{3-1-6}$ is connected to the AND gate $AND_{3-6-1}$–$AND_{3-6-6}$ for transmitting the information from the information input device and the AND gate $AND_{3-7-1}$–$AND_{3-7-6}$ for transmitting the information from the external control unit. Further, the registers $D1R_9$–$D1R_{14}$ are respectively connected to the AND gate $AND_{3-3-1}$–$AND_{3-3-6}$ for transmitting the information from the information input device, while the AND gates $AND_{3-3-1}$–$AND_{3-3-6}$ as well as $AND_{3-6-1}$–$AND_{3-6-6}$ are connected to the circuit SSWC for producing the logic value "1" in functional engagement with the slide switch SSW shown in FIG. 2 for selecting the figure to be printed so as to transmit the information to the registers $D1R_3$–$D1R_8$ or $D1R_7$–$D1R_{14}$ in accordance with the selection by the slide switch SSW. PBC is the circuit for producing the logic value "1" in functional engagement with the print key PB shown in FIG. 2 for selecting the data printing mode and is connected to the set input S of $RSFF_1$. EBC is the circuit for producing the logic value "1" in functional engagement with the key EB for determining the exposure mode such as the display of the exposure value, the printing and is connected to the AND gate $AND_{3-9}$ for transmitting the exposure information. $OR_{3-3}$ is the OR gate connected to $AND_{3-9}$ and SNBC for transmitting the data printing information to the register D1R. 4 is the external control unit shown in FIG. 1, 6 the display device shown in FIG. 1, CBC the circuit for producing the logic value "1" in functional engagement with the key CB shown in FIG. 2 for selecting the mode for printing the content of the external control unit and $AND_{3-10}$ the AND gate for driving the Flip-Flop $FF_2$ to produce an output in accordance with the selected state of the mode for printing the content of the external control unit so as to bring the AND gates $AND_{3-7-1}$–$AND_{3-7-6}$ in the opened state. $AND_{3-12-1}$–$AND_{3-13-16}$ are respectively an AND gate, whose one input terminal is connected to the output terminal of the register $C1R_1$–$C1R_{12}$ and whose other input terminal is connected to the Q output of $RSFF_1$ and the output terminal of C1SC. $OR_{1-1}$–$OR_{1-16}$ are the OR gates respectively connected to the AND gate $AND_{3-13-1}$–$AND_{3-13-16}$. $AND_{3-11-1}$–$AND_{3-11-16}$ are the AND gates, respectively connected to the output terminal of the registers $D1R_1$–$D1R_{16}$, while the output of the AND gates is connected to the OR gates $OR_{1-1}$–$OR_{1-16}$. 12 is the display device shown in FIG. 1 and is connected to the OR gates $OR_{1-1}$–$OR_{1-16}$ and presents the display elements $SS_{12-1}$–$SS_{12-16}$ such as a seven-segment type for displaying the figures or the characters corresponding to the digital value supplied through the OR gates. $TCC_{1-A}$–$TCC_{1-B}$ are the transmission control circuits connected to the AND gates $AND_{3-2-1}$–$AND_{3-4-4}$ and the registers $C1R_3$–$C1R_{16}$, transmitting the informations from $AND_{3-2-1}$–$AND_{3-2-4}$ successively to the registers $C1R_3$–$C1R_{16}$. $TCC_{2-A}$–$TCC_{2-B}$ are the transmission control circuits connected between $OR_{3-1-1}$–$OR_{3-1-6}$, $AND_{3-3-1}$–$AND_{3-3-6}$ and the registers $D1R_3$–$D1R_{14}$, serving to transmit the digital values produced through $OR_{3-1-1}$–$OR_{3-1-6}$ and $AND_{3-3-1}$–$AND_{3-3-6}$ successively to the registers $D1R_3$–$D1R_{14}$. $IN_{3-1-1}$–$IN_{3-1-6}$ are the inverters respectively connected to the one input terminal of the AND gate $AND_{3-6-1}$–$AND_{3-6-6}$, while $IN_{3-2}$ is the inverter whose input terminal is connected to the output terminal of the OR gate $OR_{4-6}$, which will be explained later.

The input terminal of the register $D1R_{13}$, $D1R_{16}$ is connected to the counter $C_4$ to be explained later, so designed as to store the content of the counter $C_4$. FIG. 3 shows the input information memory circuit 2-1, whereby in the case of the memory circuits 2-2, 2-3, the register C2R, C3R, D2R, D3R are selected in accordance with the output of C2SC and C3SC instead of C1SC.

Figure 3B:
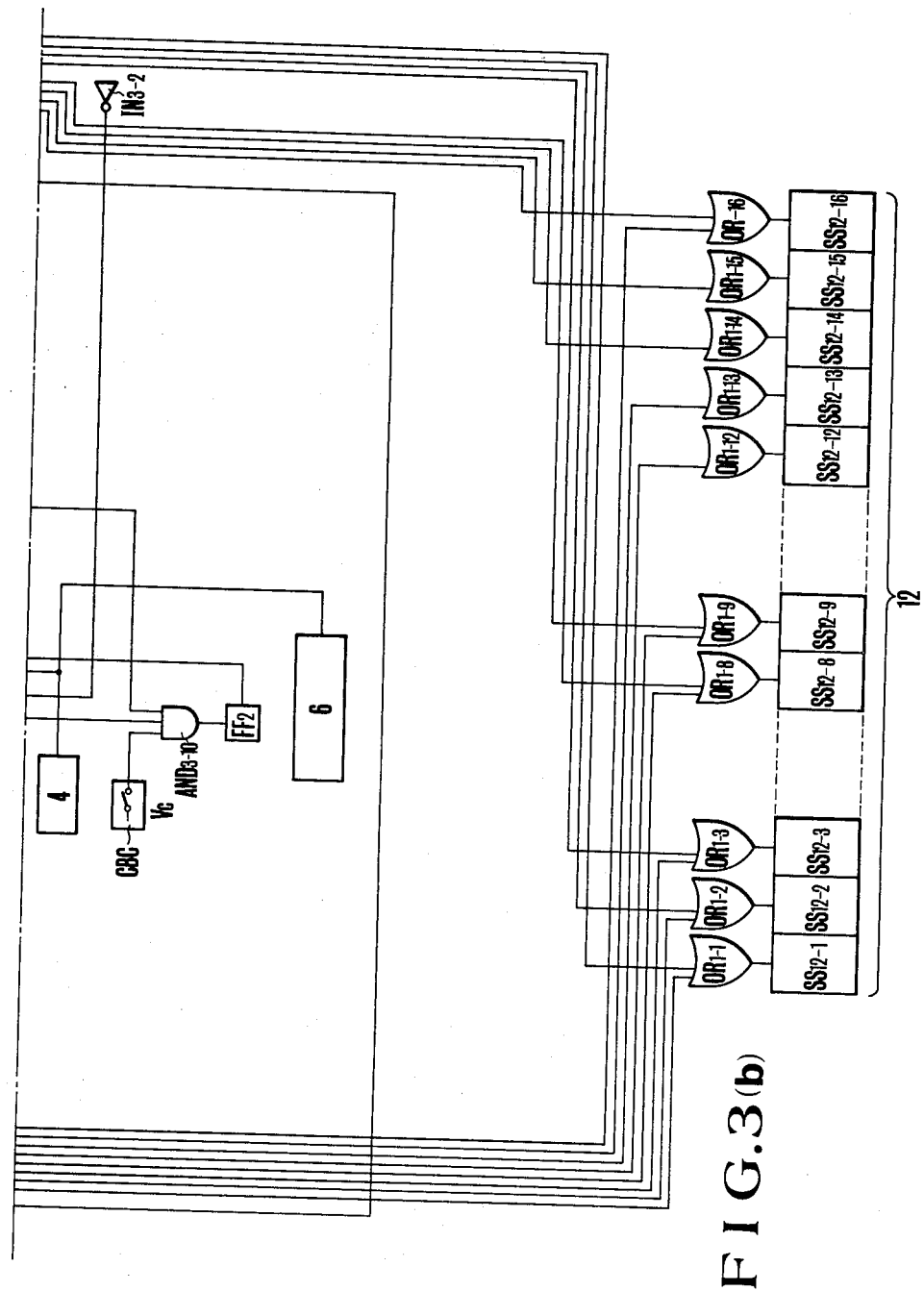
FIG. 3(c) shows a circuit diagram of an embodiment of the circuit SNB shown in FIGS. 3(a) and (b).
FIG. 3(d) shows a circuit diagram of an embodiment of the transfer control circuit $TCC_{1-A}$ shown in FIGS. 3(a) and (b).
Figure 3C:
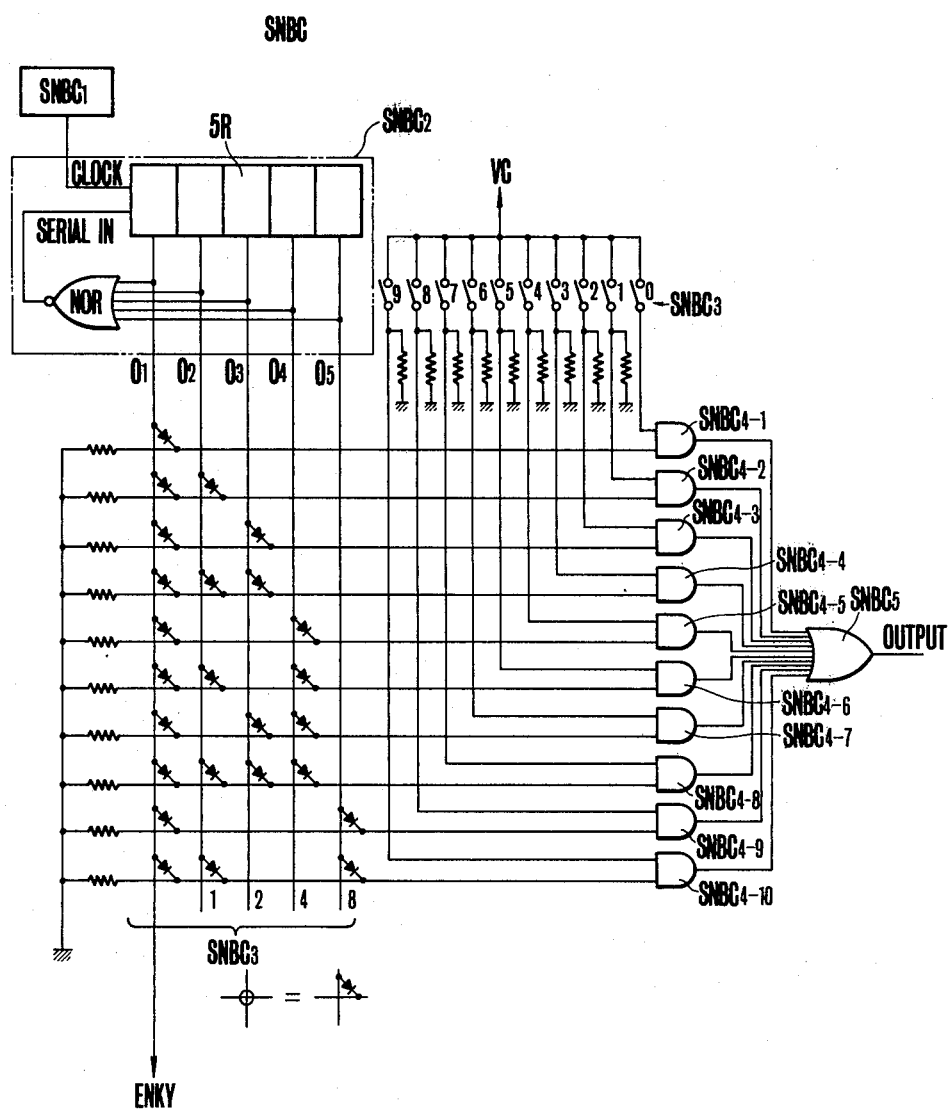

FIG. 3(c) shows a circuit diagram of an embodiment of the circuit SNBC shown in FIG. 3(a) and (b), whereby SNBC1 is the clock pulse generator while SNBC2 in shown dotted line, is the ring counter consisting of the shift register SR for counting SNBC2 and of a NOR circuit. SNBC3 is the diode matrix circuit connected to the output terminal of the shift register SNBC2, SNBC4 a switch constituting the number setting key SNB shown in FIG. 2, $SNBC_{4-1}$–$SNBC_{4-10}$ the AND gates and SNBC5 an OR gate. The circuit serves to produce serially the digital value corresponding to the numerical value selected by means of the number setting switch every time the shift register SNBC2 delivers the output successively from the output terminal $O_1$–$O_5$. Namely, when the switch 4 is closed by means of the number setting switch SNBC3, "1" is applied to the one input terminal of the AND gate $SNBC_{4-5}$ so that $O_1$ of the shift register produces the output "1", $O_2$ and $O_3$ the output "0", $O_4$ the output "1" and $O_5$ the output "0" so that the switch 4 of SNBC3 is pushed down, that is, the OR gate SNBC5 produces 1, 0, 0, 1, 0 serially in a repeated way so as to produce "0, 1, 0, 0" corresponding to 4 in the decimal system serially in a repeated way. Thus, the output of the output terminal of the sift register $O_1$ is applied to $TCC_{1-A}$–$TCC_{9-2}$, to be explained later, as the ENKY signal to (also be explained later). The circuit SNBC produces the digital value coresponding to the numerical figures chosen by the pushed down switch when the number setting switch SNBC3 is pushed down as mentioned above.

Figure 3D:
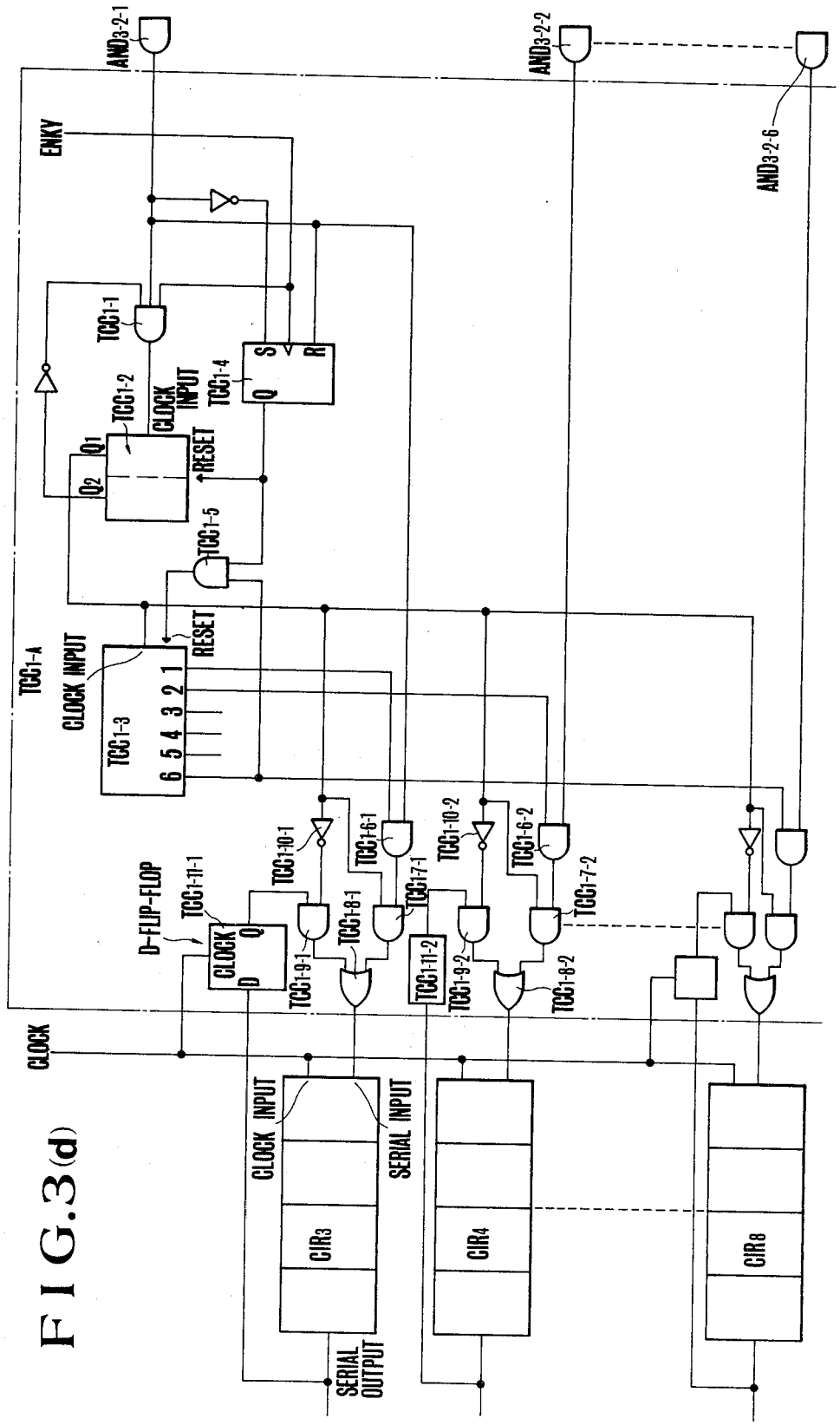

FIG. 3(d) shows a circuit diagram of an embodiment of the transmission control circuit $TCC_{1-A}$ shown in FIG. 3(a) and FIG. 3(b). The circuit consists of the register selection control part composed of the AND gate $TCC_{1-1}$ having one input connected to the output of the AND gate $AND_{3-2-1}$, a second input connected to the output $O_1$ of the shift register SNBC2 shown in FIG. 3(c). The circuit has a third input connected to the output terminal $Q_2$ of the binary counter $TCC_{1-2}$ through an inverter. The decimal counter $TCC_{1-3}$ has an input connected to the output $Q_1$ of the binary counter $TCC_{1-2}$. AND gate $TCC_{1-5}$ has an output terminal which is connected to the reset input terminal of the decimal counter $TCC_{1-3}$. AND gate $TCC_{1-5}$ has an input terminal which is connected to the output terminal of the Flip-Flop $TCC_{1-4}$ and has another input terminal connected to the output terminal 6 of the decimal counter $TCC_{1-3}$. The input gate circuit for $C1R_3$ is composed of the AND gate $TCC_{1-6-1}$ having one input terminal connected to the output terminal 1 of the decimal counter $TCC_{1-3}$, and having another input terminal connected to the output terminal of the AND gate $AND_{3-2-1}$ so as to transmit the output of $AND_{3-2-1}$ to the AND gate $TCC_{1-6-1}$, the OR gate $TCC_{1-8-1}$ for transmitting the output of $TCC_{1-7-1}$ to the register $C1R_3$, the AND gate $TCC_{1-9-1}$, the inverter $TCC_{1-10-1}$ and Flip-Flop $TCC_{1-11-1}$. The input gate circuit for the register $C1R_4$–$C1R_8$ correspond to the input gate circuit for $C1R_3$. Hereby FIG. 3(d) shows only $TCC_{1-A}$, whereby $TCC_{1-B}$–$TCC_4$ and $TCC_{9-1}$, $TCC_{9-2}$ have the same composition so that their explanation is omitted hereby.

FIG. 4(a) shows a circuit diagram of an embodiment of the control circuit shown in FIG. 1, wherein $C_{4-1}$ is the converter for converting the photographing period stored in seconds in the register $C1R_3$–$C1R_8$ of C1R into parallel signals. $G_{4-1}$ is the gate circuit connected to the converter $C_{4-1}$ so as to open the gate in synchronization with the change from low to high of the one shot multivibrator $OS_1$. $DC_{4-1}$ is the down counter for storing the information of the period converted into parallel signals by means of the converter $C_{4-1}$; $C_{4-2}$ is the converter for converting the photographing time stored in seconds in the register $C1R_9$–$C1R_{12}$ of C1R into parallel signals, $G_{4-2}$ is the gate circuit for opening the gate in synchronization of the one shot multivibrator $OS_2$; $DC_{4-2}$ is the down counter for storing the information of the photographing time converted into the parallel signals by means of the converter $C_{4-2}$; $C_{4-3}$ is the converter for converting the photographing frequency stored in the register $C1R_{13}$–$C1R_{16}$ of C1R into the parallel signals $G_{4-3}$ is the gate circuit for opening the gate with the output of the one shot multivibrator STBC. $CPO_{4-1}$ is the pulse generator for producing clock pulses with a certain determined period. $IAND_{4-1}$ is the inhibit AND gate for transmitting the pulses from the pulse generator to the down counter $DC_{4-1}$ and $AND_{4-2}$ is the AND gate for transmitting the pulses from the pulse generator to the down counter $DC_{4-2}$. $OR_7$ serves to transmit the signal from the one shot circuit STBC for producing a single pulse and the carry output from the down counter $DC_{4-1}$ to the one shot multivibrator $OS_1$ in functional engagement with the OR gate shown in FIG. 2 and the photographing start key STB shown in FIG. 2. $OR_{4-2}$ is the OR gate for transmitting the signal from STBC and the carry output from the down counter $DC_{4-2}$ to the one shot multivibrator $OS_2$ and $OR_{4-2}$ is the OR gate for transmitting the pulses from the STBC and the signal from the inhibit AND gate $IAND_{4-2}$ to the input terminal S of the RS Flip-Flop $RSFF_2$. The Q output of the RS Flip-Flop $RSFF_2$ is connected to the down counter $DC_{4-3}$ and the counter $C_4$ so as to carry out the counting every time $RSFF_2$ is set. $OR_{4-5}$ is the OR gate connected to the carry output terminal of the down counter $DC_{4-3}$, whereby the output terminal of the OR gate is connected to the $IAND_{4-2}$. The OR gates, $OR_{4-2}$, $OR_{4-3}$, $OR_{4-4}$, $OR_{4-5}$, the AND gate $AND_{4-2}$, the inhibit AND gates $IAND_{4-1}$ and $IAND_{4-2}$ are the gate circuits for the sequential timing of the photographing time, the photographing period and the photographing frequency. $OR_{4-6}$ is the OR gate connected to the Q output of $RSFF_2$, the N output terminal of the timer $TIM_{4-1}$ and the OR gate $OR_{4-7}$ for manual control. Output $R_1$ of the gate $OR_{4-6}$ is the photographing signal for controlling the release operation of the release circuit (not shown in the drawing) of the camera $Ca_1$. $AND_{4-3}$ is the AND gate for taking the AND of the pulse from the STBC and the signal from $C_1SC$, being connected to the OR gate $OR_{4-7}$ so as to transmit the release signal to the OR gate $OR_{4-6}$ at the time of the manual control. $AND_{4-4}$ is the AND gate connected to the OR gate $OR_{4-6}$ for producing the data printing signal $P_1$ in such a manner that the timing of the data printing is controlled by means of the output of the OR gate $OR_{4-6}$.

FIG. 4(a) shows an embodiment of the control circuit $M_1$ of the camera $Ca_1$ shown in FIG. 1, wherein $M_2$ and $M_3$ have the same structure as that of $M_1$.

FIG. 4(b) shows timing charts for explaining the operation of the control circuit $M_1$.

FIG. 4(c) shows a circuit diagram for showing an embodiment of the converter $C_{4-3}$, the gate circuit $G_{4-3}$ and the down counter $DC_{4-3}$. $C_{4-3}$ consists of the five bit series in parallel out register $C1R_{SR-13}$–$C1R_{SR-16}$ and the four bit latch circuit $l_{14}$–$l_{16}$ connected to the parallel output terminal of the register $C1R_{SR-13}$–$C1R_{SR-16}$ in such a manner that the ENKY signal is applied to their control terminals. Registers $C1R_{SR-13}$–$C1R_{SR-16}$ transmit the control of $C1R_{13}$–$C1R_{16}$ to the latch circuit as a parallel signal at every ENKY signal. $G_{4-3}$ consists of the AND gates $G_{4-3-1}$–$G_{4-3-16}$ respectively connected to the output terminals of the latch circuit $l_{13}$–$l_{16}$ for transmitting the output of the latch circuit $l_{13}$–$l_{16}$ to $DC_{4-3}$ with the pulse signal from STBC. $DC_{4-3}$ consists of the four bit decimal down counters $DC_{4-3-1}$–$DC_{4-3-4}$, for carrying out the counting down at every input of the Q output from $RSFF_2$. Further the converters $C_{4-1}$, $C_{4-2}$, the gate circuits $G_{4-1}$, $G_{4-2}$ and the down counter $DC_{4-1}$, $DC_{4-2}$ shown in FIG. 4(a) have the same structure as that of $C_{4-3}$, $G_{4-3}$ and $DC_{4-3}$ shown in FIG. 4(c).

The serial output terminal of $C1R_{13}$–$C1R_{16}$ is connected to the serial terminal of the register $C1R_{SR-13}$–$C1R_{SR-16}$ so that the content of the register $C1R_{13}$–$C1R_{16}$ is tranmitted to the register $C1R_{13}$–$C1R_{16}$ in a serial way in synchronization with the clock and further to the latch circuit $l_{13}$–$l_{14}$ by means of the ENKY signal at the time of the termination of the transmission in such a manner that when the circuit STBC produces an output the gate $G_{4-3}$ is opened whereby the content of every register is in parallel to the decimal down counter $DC_{4-3-1}$–$DC_{4-3-4}$.

Below, the sequential control of the photographing and the data printing operation by means of the control device in accordance with the present invention will be explained. At first, the key $C_1SB$–$C_3SB$ shown in FIG. 2 is selectively pushed down so as to select the camera to be controlled in a sequential way. Then the key $T_1B$ for setting the desired photographing period is pushed down and the desired photographing period is selected by means of the number setting key so as to be set at the register $C1R_3$–$C1R_6$ of C1R. When the camera $Ca_1$ is selected, $C_1SC$ shown in FIG. 3 produces the logic value "1", which is transmitted to an input terminal of the AND gate $AND_{3-2-1}$–$AND_{3-2-6}$ shown in FIG. 3. Together with the operation of $T_1B$, $T_1BSC$ shown in FIG. 3 produces the logic value "1", which is transmitted to another input terminal of the AND gate $AND_{3-2-1}$–$AND_{3-2-6}$. Another input terminal of the AND gate $AND_{3-2-1}$–$AND_{3-2-6}$ is connected to Q of $RSFF_1$. Accordingly, Q does not produce the logic value "1" because the key PB shown in FIG. 2 for selecting the data printing mode so that the logic value "1" is also transmitted to the input terminal of $RSFF_1$, connected to Q output of $RSFF_1$. When the number setting key is operated in this state, the numerical value corresponding to the selected number setting key is converted into a binary digital value by means of BNBC and transmitted to the remaining input terminal of the AND gate $AND_{3-2-1}$–$AND_{3-2-6}$. At this time, the AND gate $AND_{3-2-1}$–$AND_{3-2-6}$ is opened, so that along with the operation of the first number setting key, a short-circuit takes place between $AND_{3-2-1}$ and $C1R_3$ in such a manner that the digital value corresponding to the set numerical figure is delivered to only $C1R_3$. Along with the number setting thereafter, the short-circuit takes place successively between $AND_{3-2-2}$ and $C1R_4$, $AND_{3-2-3}$ and $C1R_5$, $AND_{3-2-4}$ and $C1R_6$, $AND_{3-2-5}$ and $C1R_7$ and $AND_{3-5-6}$ and $C1R_8$ in such a manner that the digital value successively set is delivered to $C1R_3$–$C1R_8$. In particular, the information of the desired photographing period is delivered to the six registers $C1R_3$–$C1R_8$. When 4 of the decimal system is to be delivered to the register $C1R_3$ by operating the number setting key, the OR gate $SNBC_5$ shown in FIG. 3(e) serially produces "1 0 0 1 0" in a repeated way in such a manner that the signal is delivered to the AND gate $AND_{3-2-1}$ shown in FIG. 3(d). Thus, the signal "1 0 0 1 0" is serially delivered to the AND gate $TCC_{1-1}$ while the one input terminal of the AND gate $TCC_{1-1}$ is connected to the output terminal of the ENKY signal so that $TCC_{1-1}$ is opened only when the ENKY signal is delivered so as to transmit the output of $AND_{3-2-1}$. Thus $TCC_{1-2}$ produces a $Q_1$ output of "1" in synchronization with the ENKY signal, which output "1" is applied to the decimal counter $TCC_{1-3}$ in such a manner that $TCC_{1-3}$ delivers the "1" signal from the output terminal 1 to the one input terminal of the AND gate $TCC_{1-6-1}$. Thus the AND gate $TCC_{1-6-1}$ transmits the serial output, namely "0 0 1 0" from the $AND_{3-2-1}$ following the ENKY signal to $TCC_{1-7-1}$. In this way, the other input terminal of $TCC_{1-7-1}$ is connected to the $Q_1$ output of $TCC_{1-2}$, and will continue to produce the "1" output until the ENKY signal is delivered so as to transmit "0 0 1 0" serially to the shift register $C1R_3$ through the OR gate $TCC_{1-8-1}$, so that the content of the register becomes "0 1 0 0". That is the digital value corresponding to 4 in the decimal system has been transmitted. Thus, when "0 1 0 0" has been transmitted to the register $C1R_3$, the next ENKY signal is produced, so that $TCC_{1-1}$ is opened again so as to allow the passage of the "1" signal from $AND_{3-2-1}$, whereby $Q_1$ of $TCC_{1-2}$ becomes "0" while $Q_2$ becomes "1". Thus, $TCC_{1-1}$ is closed and the gate $TCC_{1-7-1}$ is closed so that the output of the AND gate $AND_{3-2-1}$ is not transmitted to $C1R_3$ and the digital value corresponding to 4 is stored in $C1R_3$. When the number setting key is released and the switch 4 shown in FIG. 3(c) is opened after the data has been transmitted to $C1R_3$ in this way, the AND gate $SNBC_{4-5}$ is opened while the output of the OR gate $SNBC_5$ is kept "0" independently of the ENKY signal until another number setting key is pushed down. Thus, "1" is applied to the S input terminal of $TCC_{1-4}$, which produces a Q output is synchronization with the ENKY signal produced after the release of the number setting key. When $TCC_{1-2}$ is reset so as to produce $Q_2$ for an output "0". When the number setting key is pushed down again the AND gate $AND_{3-2-1}$ produces "1" in synchronization with ENKY signal so that $TCC_{1-2}$ transmits the $Q_1$ output to $TCC_{1-3}$ whose output terminal 2 delivers "1" signal, which signal is transmitted to the other input terminal of $TCC_{1-6-2}$ and further to $C1R_4$ through $AND_{3-2-2}$, in the same way as the digital value produced with SNBC is transmitted to $C1R_3$. This is done such a manner that the digital value corresponding to the set numerical value is stored in $C1R_4$. In this way, the data of the set number is successively stored in $C1R_5$–$C1R_8$ every time the number setting key is pushed down.

When the photographing time is to be delivered to the register $C1R_9$–$C1R_{12}$ after the delivery of the information of the photographing period in this way, the key $T_2B$ is pushed down for setting the photographing time whereby $T_2BSC$ produces the output "1" while along with the operation of the number setting key $AND_{3-3-1}$–$AND_{3-3-4}$ and the register $C1R_9$–$C1R_{12}$ are successively opened, being controlled by means of the control circuit $TCC_{1-B}$ in the same way as by means of $TCC_{1-A}$ in such a manner that the desired photographing time is successively delivered to the registers $C1R_9$–$C1R_{12}$ of C1R through the AND gate $AND_{3-3-1}$–$AND_{3-3-4}$. Along with the operation of the key $T_3B$ for setting the photographing frequency, the information of the desired photographing frequency is delivered to the registers $C1R_{13}$–$C1R_{16}$ through the AND gate $AND_{3-4-1}$–$AND_{3-4-6}$ under the control of $TCC_{1-C}$. Further, "1, 0, 1, 0" is delivered from the register CRG storing the digital value "1, 0, 1, 0" to the register $C1R_2$. AND gate $AND_{3-1}$ is opened because the Q output of $C_1SC$ and $RSFF_1$ is "1", when the photographing sequence information is delivered to the register C1R as mentioned above, $RSFF_1$ and $C_1SC$ deliver the logic value "1" to the input terminal of the AND gate $AND_{3-13-1}$–$AND_{3-13-16}$ which is opened so as to transmit the content of the register C1R to the display device 12 through the AND gate $AND_{3-13-1}$–$AND_{3-13-16}$ and the OR gate $OR_{1-1}$–$OR_{1-16}$ in such a manner that the display device displays the camera number, the mode state and the sequence conrol state. So far, the operation of the delivery of the information of the sequential control for the camera $Ca_1$ to the register C1R has been explained, wherein along with the operation of the key $C_2SB$ or $C_3SB$, the sequence information can be delivered to the registers C2R and C3R in the same way. When the sequential information is to be delivered to the register C1R–C3R while the data printing information is to be delivered to the register D1R–D3R, along with the selective operation of the camera, and the key $C_1SC$–$C_3SC$ and the key PBC the desired data is stored in the printing information memory register D1R–D3R by operating the number setting key. When it is desired that the camera $Ca_1$ should carry out the data printing, the key $C_1SB$ shown in FIG. 2 is operated. Along with the above operation, $C_1SC$ produces the logic value "1" as mentioned above, which value is transmitted to the input terminal of the AND gate $AND_{3-5}$, $AND_{3-6-1}$–$AND_{3-6-6}$ and $AND_{3-3-1}$–$AND_{3-3-6}$. Further, along with the operation of the key PB, PBC produces the logic value "1" so as to set the RS Flip-Flop $RSFF_1$ whereby the Q output assumes the logic value "1" while Q output assumes the logic value "0" in such a manner that the AND gates $AND_{3-1}$–$AND_{3-4-4}$ and the AND gates $AND_{3-13-1}$–$AND_{3-13-16}$ for delivering the information to the register C1R are closed whereby the logic value "1" is delivered to the other input terminal of the AND gates $AND_{3-5}$, $AND_{3-6-1}$–$AND_{3-6-6}$, $AND_{3-8-1}$–$AND_{3-8-6}$. Along with the operation of the slide switch SSW for selecting the figures to be printed, a group of the registers $D1R_3$–$D1R_5$ or $D1R_9$–$D1R_{16}$ of D1R is selected. When now the slide switch SSW is moved to the left, the circuit (1) of SSWC produces the logic value "1" which is transmitted to the input terminal of the AND gate $AND_{3-6-1}$–$AND_{3-6-6}$. Further, when the key CB is not pushed down, the Flip-Flop $FF_2$ produces the logic output "0", which is converted into "1" by means of the inverter $IN_{3-1-1}$–$IN_{3-1-6}$ so as to be transmitted to the input terminal of the AND gate $AND_{3-6-1}$–$AND_{3-6-6}$. By means of the above mentioned series of operations, the AND gates $AND_{3-5}$ and $AND_{3-6-1}$–$AND_{3-6-6}$ are opened while the numerical value selected by the manner setting key is converted into a binary decimal value by means of SNBC so as to be transmitted to the registers $D1R_3$–$D1R_6$ successively through the AND gates $AND_{3-6-1}$–$AND_{3-6-6}$, the OR gates $OR_{3-1-1}$–$OR_{3-1-6}$ by means of the control circuit $TCC_{2-A}$ in the same way as the data transmission to the register C1R by means of $TCC_{1-A}$. Further as mentioned above, the Q output of $RSFF_1$ is 1 so that the AND gate $AND_{3-5}$ is opened while the one shot circuit OSM produces an output and during this time the digital value "1, 0, 1, 1" representing the data printing mode is delivered to the register $D1R_2$ from the register PRG, while the information from the registers $D1R_1$–$D1R_8$ are transmitted to the display device 12, so as to be displayed, through the AND gates $AND_{3-11-1}$–$AND_{3-11-16}$ whose input terminal are supplied with the logic value "1", so as to open the AND gates and the OR gates $OR_{1-1}$–$OR_{1-16}$. When the printing information is to be delivered to the figure of $D1R_9$–$D1R_{14}$, the slide switch SSW is moved to the right in such a manner that (2) of SSWC produces the logic value "1" so as to bring $AND_{3-8-1}$–$AND_{3-8-6}$ into the opened state. After that, along with the operation of the number setting key, the desired data is delivered to $D1R_9$–$D1R_{14}$ by means of the operation of $TCC_{2-B}$. By means of the above operations, the data to be printed is stored in D1R. Further, in order to deliver the data to the registers D2R and D3R for the camera $Ca_2$ and $Ca_3$, the key $C_2SB$, $C_3SB$ is selectively pushed down in the same way as the data is delivered to D1R.

Figure 5A:
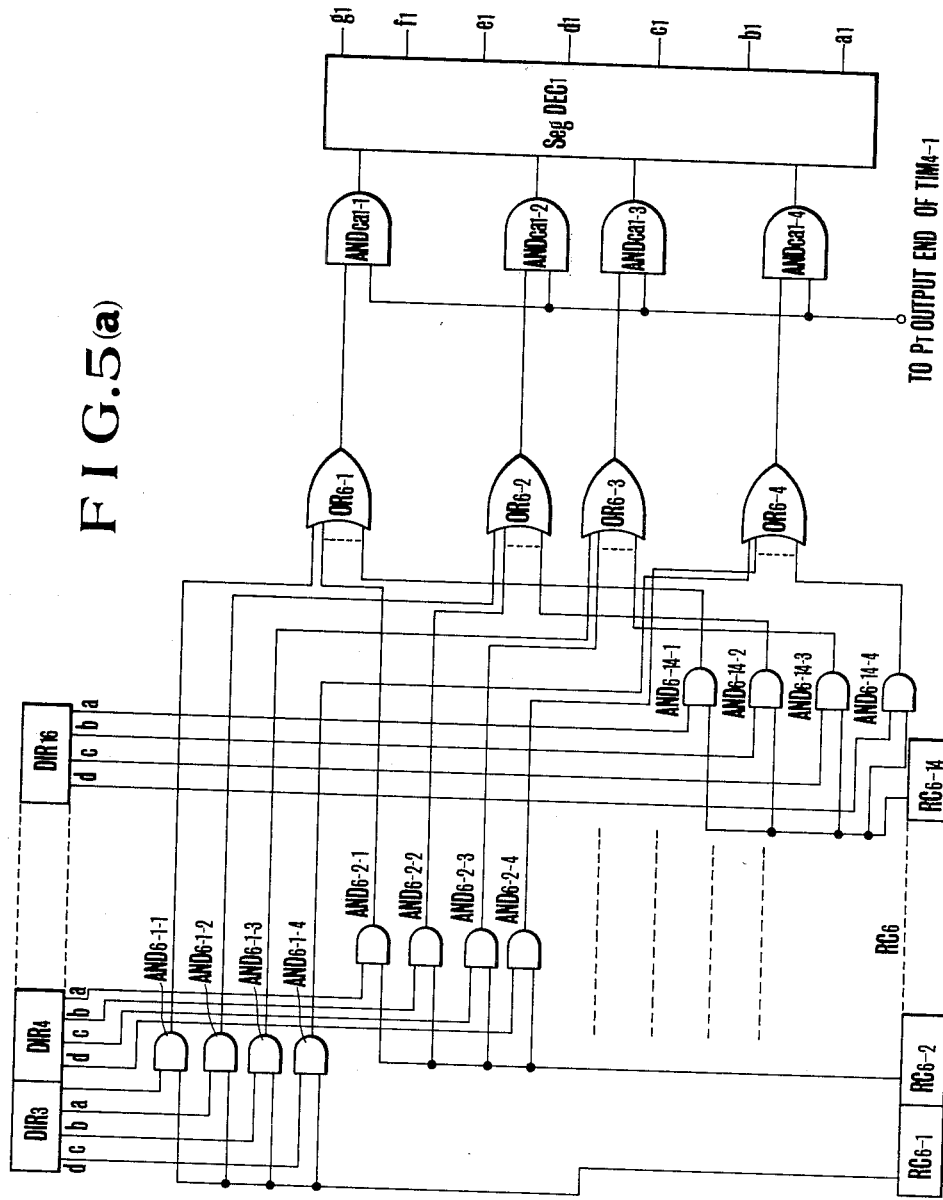
FIG. 5(a) shows a circuit diagram of an embodiment of the printing information transfer circuit $F_1$ shown in FIG. 1.

After the sequential control information and the data printing information have been delivered to the register C1R–C3R and D1R–D3R by means of the above mentioned operation, the auto mode is selected by operation of the auto-manual mode selective switch AMSW, shown in FIG. 2. AMSW shown in FIG. 4(a), is then connected to the contact a, at the auto side, while when the start key STB shown in FIG. 2 is pushed down STBC (one shot circuit) starts to operate producing a single pulse as is shown in (1) in FIG. 4(b), which pulse is transmitted to the one shot multivibrator $OS_1$ through $OR_7$ so as to trigger $OS_1$ and produce pulse signals as is shown in (2) in FIG. 4(b). Further, the pulses from STBC are delivered to the set input S of $RSFF_2$ through $OR_{4-3}$ so as to set $RSFF_2$ as is shown in (6) in FIG. 4(b) and which, produce the Q output and at the same time are delivered to the one shot vibrator $OS_2$ through $OR_{4-2}$ so as to actuate $OS_2$ and produce pulses as is shown in (4) in FIG. 4(b). Further, the pulses of $OS_1$ and $OS_2$ are transmitted to the gate $G_{4-1}$ and $G_{4-2}$ so as to open the gates in such a manner that the information of the photographing period stored in form of seconds in the register $C1R_3$–$C1R_8$ is converted into a digital value of parallel signal by means of the serial-to-parallel converter $C_{4-1}$ so as to be delivered to the down counter $DC_{4-1}$. The information of the photographing time stored in the form of seconds in the register $C1R_9$–$C1R_{12}$ is converted into a digital value corresponding thereto by means of the serial-to-parallel converter $C_{4-2}$ so as to be delivered to the down counter $DC_{4-2}$. The pulses of STBC is transmitted to the gate $G_{4-3}$ in such a manner that the information of the photographing frequency stored in the registers $C1R_{13}$–$C1R_{16}$ is converted into a parallel signal by means of the serial-to-parallel converter $C_{4-3}$ so as to be delivered to the lower container $D_{4-3}$, whereby the Q output of $RSFF_2$ is delivered to the down input terminal of the down counter $DC_{4-3}$ in such a manner that the content of the down counter is counted down. Further, the Q output is transmitted to the counter $C_4$ is such a manner that the content of the counter is counted down. Further, the Q output is transmitted to the AND gate $AND_{4-2}$ or the OR gate $OR_{4-6}$ so as to open the gates as is shown in (7) and (10) in FIG. 4(b) in such a manner that the pulse signal from the pulse generator $CPO_{4-1}$ is transmitted to the down counter $DC_{4-2}$ while $OR_{4-6}$ is driven to produce the output $R_1$ so as to release the camera $Ca_1$. Further, $OR_{4-6}$ produces the logic value "1" because the AND gate $AND_{4-4}$ assumes the AND operation for producing the AND output $P_1$ as is shown in (11) in FIG. 4(b) which output is transmitted to the printing operation control circuit TDK shown in FIG. 1 so as to drive TDK and the display means for the data printing in the camera $Ca_1$ through the printing information transmission circuit $F_1$ shown in FIG. 1 in order to print the data on the film. The output of $OR_{4-6}$ is delivered to the timer $T1M_{4-4}$ so as to drive the timer to produce the output as is shown in (9) in FIG. 4(b). When the pulse of $OS_1$ is extinguished, the inhibit AND gate $IAND_{4-1}$ is opened as is shown in (8) in FIG. 4(b) so as to transmit the pulses to the down counter $DC_{4-1}$ and count down the content of the counter $DC_{4-1}$. Further, the pulses of $CPO_{4-1}$ are transmitted to the down counter $DC_{4-2}$ from the time when the AND gate $AND_{4-2}$ is opened in such a manner that the content of $DC_{4-2}$ is counted down every time a pulse is delivered. By means of the above mentioned process, the pulses are delivered to the down counters $DC_{4-1}$ and $DC_{4-2}$ so as to carry out the counting down. When the data printing has been carried out by means of the display means (not shown in the drawing) for the data printing during the time determined by the timer $T1M_{4-1}$, the timer $T1M_{4-1}$ is opened as is shown in (9) in FIG. 4(b) so as to bring the printing information transmission circuit into an inoperable state and to terminate the data printing operation $F_1$. After the termination of the data printing operation, the counting down operation by the down counter $DC_{4-2}$ advances until the digital value corresponding to the photographing time delivered to the counter and the number corresponding to the digital value of the pulses delivered from $CPO_{4-1}$ to the counter are delivered. Then, the down counter $DC_{4-2}$ produces the carry output as is shown in (12) in FIG. 4(b). When now the carry output is produced at the time point $t_2$ in FIG. 4(b), the carry output is transmitted to the reset terminal R of $RSFF_2$ at the time point $t_2$ so as to reset $RSFF_2$. Thus, the Q output becomes the logic value "0", whereby the timer $T1M_{4-1}$ is opened so as to bring $OR_{4-6}$ in the closed state and extinguish $R_1$ output in such a manner that the current supply to the camera $Ca_1$ is stopped to suspend the photographing. In consequence, the release time, namely the photographing time of the camera $Ca_1$, is from the time point to at which the AND gate $AND_{4-2}$ is opened to the time point at which the down counter $DC_{4-2}$ produces the carry output, during which time the camera, which is in the released state, carries out the continuous photographing if the camera is mounted on the motor drive device. Further, when the camera is mounted on the motor drive device and set to photograph picture by picture, a picture is taken every time when $OR_{4-6}$ produces an output. Further, when the Q output of $RSFF_2$ becomes "0" at the time point $t_2$, the AND gate $AND_{4-2}$ is brought into the closed state as is shown in (7) in FIG. 4(b) so as to stop the counting of the pulses from $CPO_{4-1}$ by the counter $DC_{4-2}$. The carry output of the $DC_{4-2}$ is transmitted to $OS_2$ through the OR gate $OR_{4-7}$ so as to open the gate $G_{4-2}$ for an instance and deliver the information of the photographing time to the down counter $DC_{4-2}$. When the information of the photographing time is delivered to the counter, the carry output is extinguished. By means of this operation, the first photographing is finished and later at the time point $t_3$ the content of the down counter $DC_{4-1}$ is counted down by means of the pulses from $CPO_{4-1}$ so as to produce the carry output as is shown in (13) in FIG. 4(b) at that time, the inhibit AND $IAND_{4-2}$ and $OR_{4-3}$ are opened so as to deliver the logic value "1" to the set input S of $RSFF_2$, which produces the Q output again. Further, the carry output of $DC_{4-1}$ is transmitted to the one shot multivibrator $OS_1$ through $OR_7$, in such a manner that the gate $G_{4-1}$ is opened by means of the output of $OS_1$ so as to deliver the information of the photographing period to $DC_{4-1}$, to close the inhibit AND $IAND_{4-1}$ for an instance and to stop the counting of the pulses from $CPO_{4-1}$ for an instant. When $OS_1$ is inverted $IAND_{4-1}$ is opened again so as to start the counting down of the content newly delivered to $DC_{4-1}$ again. Further, the Q output of $RSFF_2$ produced at the time point $t_3$ is transmitted to the OR gate $OR_{4-6}$, producing the output $R_1$ again so as to start the release to the (not shown) circuit of the camera $Ca_1$ and to start photographing. In consequence, the photographing period is controlled by means of the carry output of $DC_{4-1}$. Further, at this time, $AND_{4-2}$ is opened so as to transmit the pulses from $CPO_{4-1}$ to the down counter $DC_{4-2}$ and to start the counting down of the content corresponding to the photographing time. This is done in such a manner that, in the same way as previously mentioned, $RSFF_2$ is reset by means of the carry output from the counter $DC_{4-2}$ so as to stop the release to the camera $Ca_1$ and to control the photographing time. $RSFF_2$ is set every time a carry output is produced from the down counter $DC_{4-1}$ to start the release to the camera $Ca_1$ through $OR_{406}$ and to control the photographing period. The the operation is repeated until the carry output is produced from the down counter $DC_{4-3}$. Namely, $RSFF_2$ produces at every photographic occurence a Q output to be counted by the counter $C_4$ and at the same time delivered to the down counter $DC_{4-3}$. The counting down is thus made from the digital value corresponding to the photographic occurence frequency at every photographing until the carry output is produced. That is, the photographing corresponding to the set photographing frequency is started by which the inhibit AND $IAND_{4-2}$ is kept in the closed state by means of the carry output and $RSFF_2$ is kept in the reset state even if after photographing the down counter $DC_{4-1}$ produces the carry output, so as to terminate the photographing under the sequential control. Further, in the case of the above mentioned process, every time the conter $C_4$ counts, the content of the counter $C_4$ is transmitted to the registers $D1R_{15}$, $D1R_{16}$, while at every photographic occurence the information of the photographing frequency is displayed by means of the display elements $SS_{1-13}$, $SS_{1-14}$ shown in FIG. 6 so as to be printed on the film as the photograph number. Thus far, only the sequential control of the camera $Ca_1$ has been explained, but the cameras $Ca_2$ and $Ca_3$ can also be controlled by means of $M_2$ and $M_3$ in the same way in accordance with the photographing period, the photographing time and the photographing frequency set in the registers C2R and C3R. FIGS. 5, 6, 7 and 8 respectively show a control circuit for controlling the data printing operation of the control device in accordance with the present invention, whereby FIG. 5(a) shows the printing information transmission circuit $F_1$ for transmitting the information stored in the registers $D1R_3$–$D1R_{16}$ of D1R shown in FIGS. 1, 3, 4(a) for storing the printing information to the printing information display circuit in the camera $Ca_1$ shown in FIG. 6. $D1R_3$–$D1R_{16}$ are the four bit registers of D1R, while a–d represent the output terminals of the Flip-Flop constituting each bit of each register. $AND_{6-1-1}$–$AND_{6-1-4}$ are respectively an AND gate having one input terminal respectively connected to the output terminals a–d of the register $D1R_3$ while $AND_{6-2-1}$–$AND_{6-2-4}$ are respectively an AND gate having one input terminal respectively connected to the output terminals a–d of the register $D1R_4$, whereby four AND gates ($AND_{6-1-1}$–$AND_{6-1-4}$, $AND_{6-2-1}$–$AND_{6-2-4}$, . . . $AND_{6-14-1}$–$AND_{6-14-4}$) are connected to the output terminals a, b, c and d of each register $D1R_3$–$D1R_{16}$. $RC_6$ is a 14 bit ring counter, whereby $RC_{6-1}$–$RC_{6-14}$ are the Flip-Flops for constituting each bit. The output terminals of each Flip-Flop is connected to the other input terminals of the four AND gates connected to the output terminals of each register. $OR_{6-1}$ is the OR gate connected to the output terminal of the AND gates ($AND_{6-1-1}$, $AND_{6-2-1}$, . . . $AND_{6-14-1}$) connected to the output terminals a of each register. $OR_{6-2}$ is the OR gate connected to the output terminals of the AND gates ($AND_{6-1-2}$, $AND_{6-2-2}$, . . . $AND_{6-14-2}$) connected to the output terminals b of each register. $OR_{6-3}$ is the OR gate connected to the output terminals of the AND gates ($AND_{6-1-3}$, $AND_{6-2-3}$, $AND_{6-14-3}$) connected to the output terminals c of each register. $OR_{6-4}$ is the OR gate connected to the output terminals of the AND gates ($AND_{6-1-4}$, $AND_{6-2-4}$, . . . $AND_{6-14-4}$) connected to the output terminals d of each register. Further, the output terminals of the OR gates $OR_{6-1}$–$OR_{6-4}$ are respectively connected to the AND gates $AND_{Ca1-1}$–$AND_{Ca1-4}$. The counting period of the Flip-Flop $RC_{6-1}$–$RC_{6-14}$ constituting each bit of ring counter $RC_6$ is chosen equal to one cycle of the clock pulse delivered to TDC. As mentioned earlier, the one input terminal of $AND_{Ca1-1}$–$AND_{Ca1-4}$ is respectively connected to the output terminal of $OR_{6-1}$–$OR_{6-4}$, while the other input terminal is respectively connected to the output terminal $P_T$ of the timer $TIM_{4-1}$ shown in FIG. 4. Seg $DEC_1$ is the segment decoder connected to $AND_{Ca1-1}$–$AND_{Ca1-4}$ so as to convert the 4 bit digital information produced from AND gates $AND_{Ca1-1}$–$AND_{Ca1-4}$ into the digital code for the seven segments, whereby $a_1$–$h_1$ are the output terminals of the segment decoder. Further, the composition of $F_2$, $F_3$ is the same as that of the circuit $F_1$ shown in FIG. 5(a).

Figure 5B:
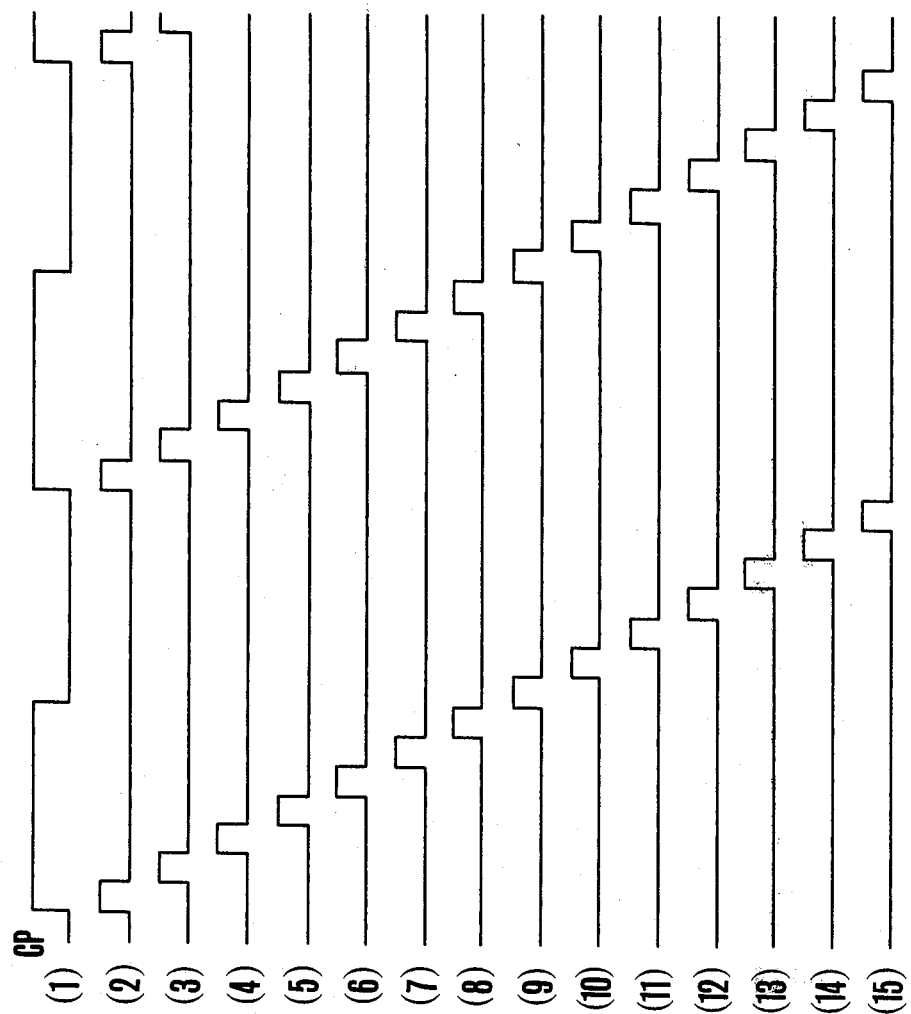
FIG. 5(b) shows timing chart for explaining the operation of the ring counter $RC_6$ shown in FIG. 5(a).
Figure 7A:
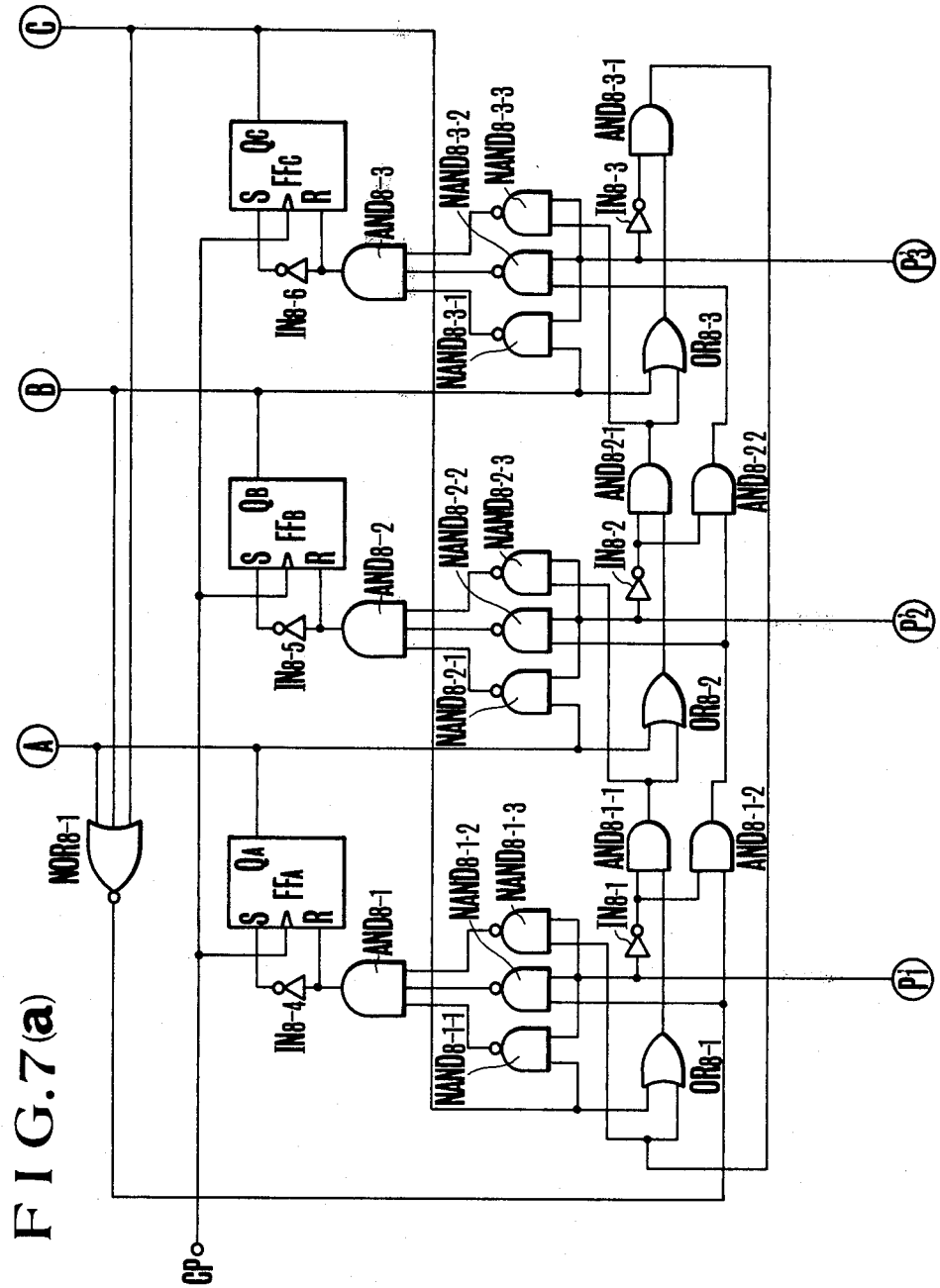
FIG. 7(a) shows a circuit diagram of an embodiment of TDC shown in FIG. 1.
Figure 7:
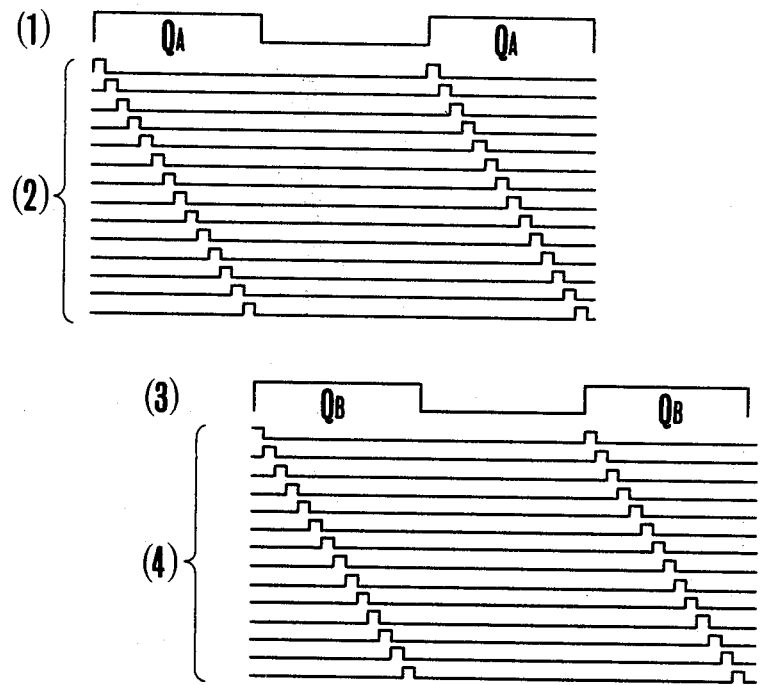
FIG. 7(b) shows timing chart for explaining the operation of TDC of FIG. 7(a).
FIG. 7(c) shows timing chart for showing the relation of the operation timing between TDC shown in FIG. 7(a) and the ring counter $RC_6$ shown in FIG. 5(a).

FIG. 5(b) shows a timing chart for explaining the operation of the ring counter $RC_6$ shown in FIG. 5(a), whereby (1) shows the TDC clock CP shown in FIG. 7(a), (2) the output of the Flip-Flop $RC_{6-1}$ of the ring counter $RC_6$ and (3)–(15) the output of each Flip-Flop $RC_{6-2}$–$RC_{6-14}$.

Figure 6:
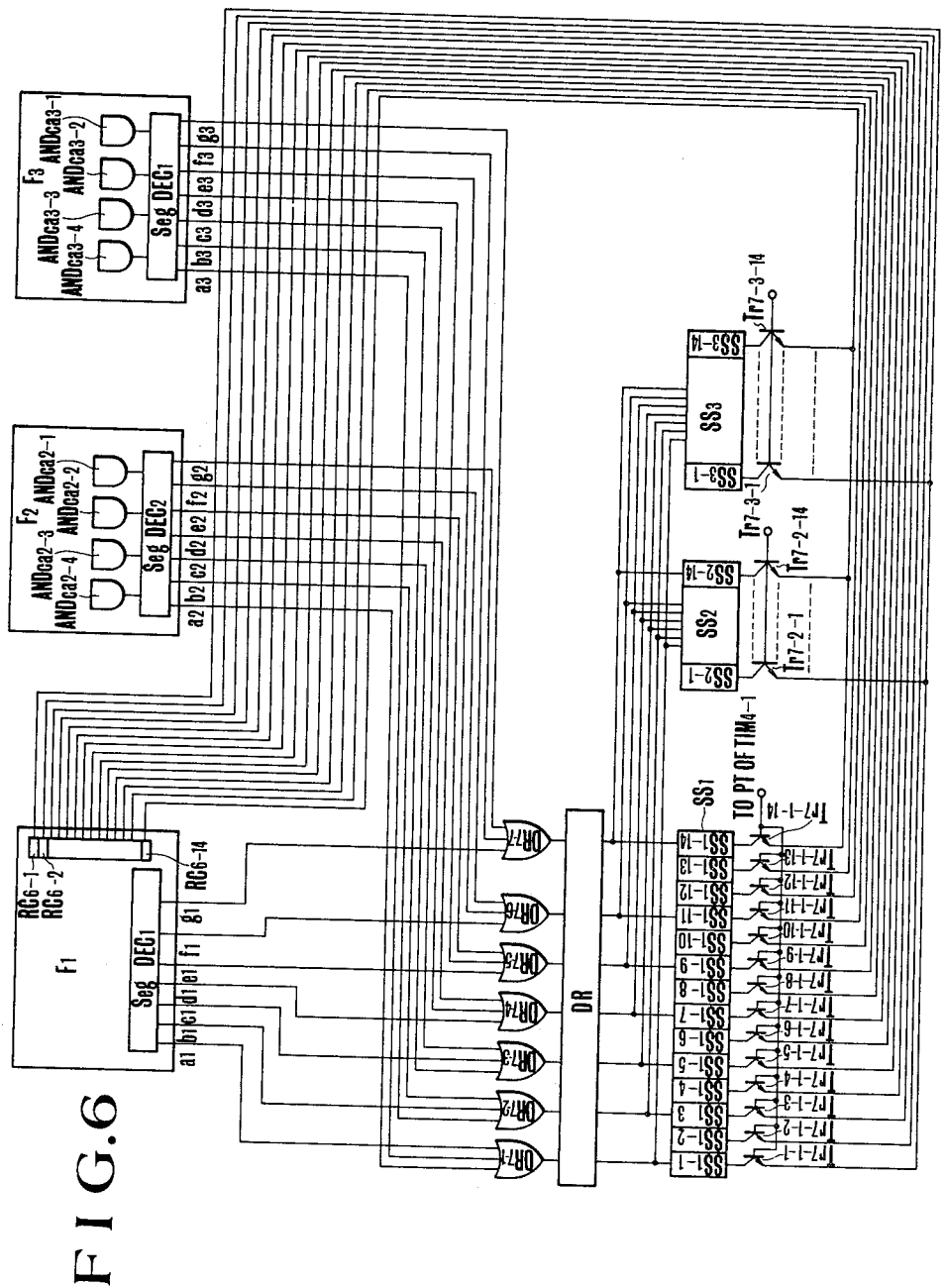
FIG. 6 shows a circuit diagram of an embodiment of the data printing display circuit in the camera $Ca_1$–$Ca_3$ shown in FIG. 1.

FIG. 6 shows the driver circuit for data printing and the display circuit for data printing shown in FIG. 1, whereby $F_1$–$F_3$ are the transmission circuit shown in FIG. 1, Seg $DEC_1$–Seg $DEC_3$ the decoder drivers in $F_1$–$F_3$, $RC_6$ the ring counter in $F_1$, and $OR_{7-1}$–$OR_{7-7}$ the OR gate corresponding to the OR gate $OR_6$ shown in FIG. 1. Hereby $OR_{7-1}$ is connected to the output terminal $a_1$–$a_3$ of the Seg $DEC_1$–Seg $DEC_3$. Further, $OR_{7-2}$–$OR_{7-7}$ are connected to the output terminals $(b_1$–$b_2)$–$(g_1$–$g_2)$ of seg $DEC_1$–Seg $DEC_3$ in the same way as in the case of $OR_{7-1}$. DR is the driving circuit for the seven segments connected to the OR gates $OR_{7-1}$–$OR_{7-7}$ shown in FIG. 1, while $SS_{1-1}$–$SS_{1-14}$ are the seven segments. The seven segments $SS_{1-1}$–$SS_{1-4}$ are composed as one body in the camera $Ca_1$ so as to constitute the display circuit for the camera $Ca_1$ for data printing in such a manner that when $SS_{1-1}$–$SS_{1-14}$ light up, the data is printed on the film. $Tr_{7-1-1}$–$Tr_{7-1-14}$ are the transistors respectively connected to the seven segment $SS_{1-1}$–$SS_{1-14}$, whereby the base of the transistors $Tr_{7-1-1}$–$Tr_{7-1-14}$ is connected to the $P_T$ output of the timer $TIM_{4-1}$.

$SS_2$ and $SS_3$ are the display circuits for data printing provided in the cameras $Ca_2$ and $Ca_3$, being composed in the same way as in the case of $SS_1$. $Tr_{7-2-1}$–$Tr_{7-2-14}$ are the transistors connected to $SS_2$ in the same way as in the case of the transistors $Tr_{7-1-1}$–$Tr_{7-1-14}$. The base of the transistors $Tr_{7-2-1}$–$Tr_{7-2-14}$ is connected to the output of the timer for the camera $Ca_2$ whose composition is same as that of the timer $TIM_{4-1}$. $Tr_{7-3-1}$–$Tr_{7-3-14}$ are the transistors composed in the same way as in the case of $Tr_{7-1-1}$–$Tr_{7-1-14}$ and connected to $SS_2$. The base of the transistors is connected to the output terminal of the timer for the camera $Ca_3$ composed in the same way as in the case of the timer $TIM_{4-1}$.

FIG. 7(a) shows a circuit diagram of an embodiment of TDC, being so designed that the output $P_1$, $P_2$ and $P_3$ of the control circuit $M_1$, $M_2$ and $M_3$ are delivered to their input terminals $P'_1$, $P'_2$ and $P'_3$.

$OR_8$–$OR_{8-3}$ are the OR gates, $AND_{8-1-1}$–$AND_{8-3-1}$, $AND_{8-1}$–$AND_{8-2}$ the AND gates, $NAND_{8-1-1}$–$NAND_{8-3-3}$ the NAND gates, $IN_{8-1}$–$IN_{8-6}$ the inverters and $NOR_{8-1}$ the NOR gates, whereby these gates are the control gates for controlling the timing for setting and resetting the RS Flip-Flop $FF_A$–$FF_C$ by means of the signals delivered to $P'_1$–$P'_3$. Further, the output terminals A, B and C for delivering the output $Q_A$–$Q_C$ of $FF_A$–$FF_C$ are respectively connected to the timer $TIM_{4-1}$ and the timers for the camera $Ca_2$–$Ca_3$ shown in FIG. 4. FIG. 7(b) shows the timing charts for explaining the operation of TDC, whereby (1) shows the clock pulses delivered to the Flip-Flop $FF_A$–$FF_C$, (2) and (3) the $Q_A$ output when the $P_1$ output is only delivered to the $P_1$ input terminal, (4), (5), (6) and (7) show the $Q_A$ output and $Q_B$ output when the $P_1$ output and the $P_2$ output are delivered to the $P'_1$ input terminal and $P_2$ input terminal and (8), (9), (10), (11), (12) and (13) the $Q_A$ output, the $Q_B$ output and the $Q_C$ output when the $P_1$ output, the $P_2$ output and the $P_3$ output are delivered to the $P'_1$ input terminal, the $P'_2$ input terminal and the $P'_3$ input terminal. FIG. 7(c) shows the timing chart for showing the relation between the $Q_A$ output and the $Q_B$ output on the one hand and the output of the ring counter $RC_6$ on the other hand.

FIG. 8(a) shows a circuit diagram of a structure of the timer $TIM_{4-1}$ shown in FIG. 4(a). INT is the integrating circuit, being operated by means of the $R_1$ output from the OR gate $OR_{4-6}$ shown in FIG. 4(a). The INT is connected to the A output terminal of $FF_A$ so as to integrate the $Q_A$ output of $FF_A$. $AND_{8-1}$ is the AND gate whose input terminal is connected to the integrating circuit INT and to the QA output terminal of $FF_A$. N and $P_T$ are the output terminals of the timer, whereby the $P_T$ output terminal is connected to the $AND_{Ca1-1}$-$AND_{Ca1-4}$ and to the base of $Tr_{7-1-1}$-$Tr_{7-3-14}$ shown in FIGS. 5 and 6, while the N output terminal is connected to the input terminal of the OR gate $OR_{4-6}$ shown in FIG. 4(a). FIG. 8(b) shows a circuit diagram of an embodiment of the integrating circuit INT, whereby SWINT is the conventional analog switch to be closed by means of the $R_1$ signal so as to transmit the input signal A from RC to the integrator and TrINT is the transistor so designed as to be opened by means of the $R_1$ signal. ININT is the inverter whose threshold level is set for producing a "0" when the output of the condenser C reaches a certain determined electrical potential and ANINT the AND gate delivered with the $R_1$ output and the output of ININT.

Before explaining the data printing operation, the operation of TDC shown in FIG. 7(a) will be explained below. When only the output $P_1$ is produced as is shown in FIG. 7(b) and delivered to $P'_1$, the logic value "1" is delivered to the one input terminal of $NAND_{8-1-2}$ and because at the initial state $FF_A$-$FF_C$ are not set and do not produce the outputs $Q_A$-$Q_C$. Thus, $NOR_{8-1}$ produces the logic value "1", which is delivered to the other input terminal of $NAND_{8-1-2}$ while $NAND_{8-1-2}$ produces the logic value "0" so that $AND_{8-1}$ produces the logic value "0", which is inverted through the inverter $IN_{8-4}$ so as to be delivered to the set terminal S of $FF_A$ in such a manner that the $Q_A$ output is produced as is shown in (3) in FIG. 7(b). Although at this time $NOR_{8-1}$ produced "0", the $Q_A$ output is produced so that $OR_{8-2}$ produces "1". Further $P_2$ does not produce any output so that $IN_{8-2}$ produces "1" and also $AND_{8-2-1}$ produces "1", which is delivered to the one input terminal of $AND_{8-3-1}$. At this time, the $P_3$ output is not produced so that $IN_{8-2}$ produces "1" and also $AND_{8-3-1}$ produces "1", which is delivered to the one input terminal of $NAND_{8-1-2}$, while $P_1$ output is delivered to the other input terminal of $NAND_{8-1-3}$ so that $NAND_{8-1-3}$ keeps producing a "0" level and the $Q_A$ output is produced until the $P_1$ output is extinguished. Further, when $P_1$ and $P_2$ are produced as is shown in (4) and (5) in FIG. 7(b), the $Q_A$ output is produced by means of $P_1$ as mentioned above. At the time point at which the $P_2$ output is produced, namely at time point $t_2$, both inputs of $NAND_{8-2-1}$ are "1" so that $NAND_{8-2-1}$ produces "0". Thus, $AND_{8-2}$ produces a "0" which is delivered to the set terminal S of $FF_B$ through $IN_{8-3}$ so as to set $FF_B$, whereby $FF_B$ does not produce a $Q_B$ output until the clock pulse CP as shown in (1) in FIG. 7(b) is delivered and the $Q_B$ output is produced only in synchronization with the clock pulses CP. At the time point at which the $P_2$ output is produced, $AND_{8-2-1}$ and $AND_{8-2-2}$ produce a "0" level so that $AND_{8-3-1}$ also produces a "0". $NAND_{8-1-3}$ produces a "1", while $NAND_{8-1-2}$ also produces a "1" because $NOR_{8-1}$ produces a "0", so that $NAND_{8-1-1}$ produces a "1" because $FF_C$ does not produce the output $Q_B$. Therefore, $AND_{8-1}$ produces a "1" so as reset $FF_A$. Further, as mentioned above, when $Q_B$ is produced, a "1" is delivered to the one input terminal of $AND_{8-3-1}$ through $OR_{8-3}$, whereby $P_2$ is not produced so that $AND_{8-3-1}$ produces a "1", immediately after $Q_B$ is produced, which "1" is transmitted to $NAND_{8-1-3}$ which produces "0". Thus, $AND_{8-1}$ again produces "0", whereby the set terminal S is brought in the set state through $IN_{8-4}$ so as to produce the $Q_A$ output again by means of the next clock pulse. Further at the time point at which the $Q_A$ output is distinguished as mentioned afore, $NAND_{8-2-1}$ produces a "1" so that $AND_{8-2}$ also produces "1" which is transmitted to the reset terminal R in such a manner that when $Q_A$ is produced by means of the next clock pulse as mentioned above, the $Q_B$ output is not produced. The $Q_A$ output and the $Q_B$ output are produced alternatively in synchronization with the clock pulses CP. Further, when $P_1$, $P_2$ and $P_3$ are produced as is shown in (8), (9) and (10) in FIG. 7(b), the outputs $Q_A$, $Q_B$ and $Q_C$ are produced in the same way as is shown in (11)-(13).

Figure 8:
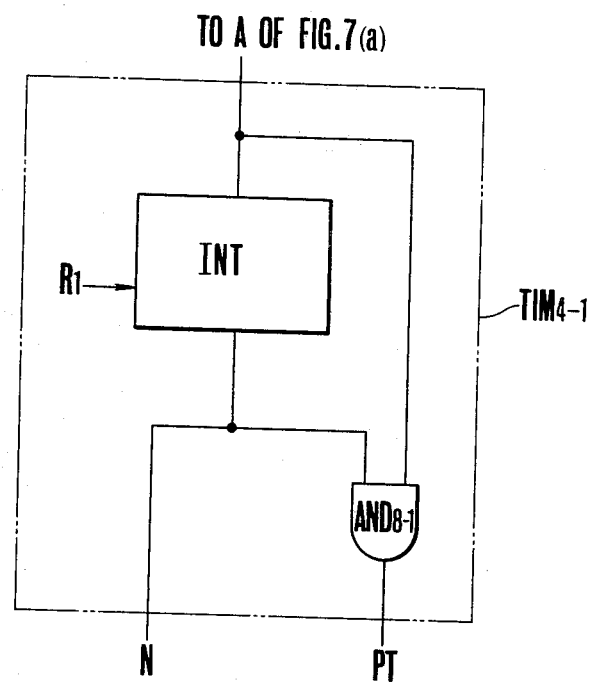
FIG. 8(a) shows a circuit diagram of an embodiment of the timer $T1M_{4-1}$ shown in FIG. 4(a).
FIG. 8(b) shows a circuit diagram of an embodiment of the integrating circuit INT shown in FIG. 8(b).
Figure 8:
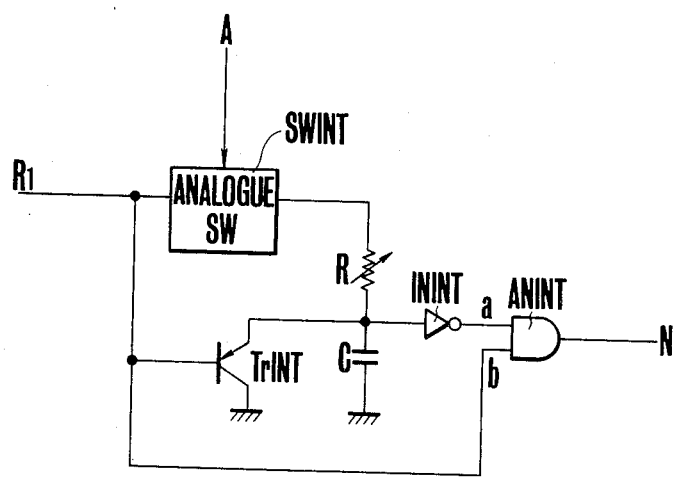

Below, the data printing operation will be explained. When the OR gate $OR_{4-6}$ shown in FIG. 4(a) is opened during the afore mentioned sequential control operation, the OR gate $OR_{4-6}$ produces the output $R_1$ so as to start the release of the camera $Ca_1$. $AND_{4-4}$ produces the output $P_1$ which is delivered to the $P'_1$ input terminal of TDC shown in FIG. 7(a). When only the camera $Ca_1$ is ready for photographing and the cameras $Ca_2$ and $Ca_3$ are not, as is shown in FIG. 7(b), only the output terminal A of the Flip-Flop $FF_A$ delivers the output $Q_A$. This output is delivered to the integrating circuit INT constituting the timer $TIM_{4-1}$ shown in FIG. 8, which integrating circuit INT integrates the output of $FF_A$, while, because the inverter ININT produces a "1" until the electrical potential of the condenser C reaches a certain determined value, the AND ANINT produces, "1" which is delivered to the OR gate $OR_{4-6}$ shown in FIG. 4(a) through the terminal N and further to the one input terminal of the AND gate $AND_{8-1}$ shown in FIG. 8(a). Thus, the AND gate assumes the AND of the output of $FF_A$ and the integrating circuit INT in such a manner that the $P_T$ output is produced and transmitted to the AND gates $AND_{Ca1-1}$-$AND_{Ca1-4}$ shown in FIG. 5(a) so as to open the gates. Further, at this time, the printing information stored in the registers $D1R_3$-$D1R_{16}$ is delivered to the segment decoder SegDEC$_1$ shown in FIGS. 5 and 6 through the gate $AND_{Ca1-1}$-$AND_{Ca1-4}$, which operation will be explained below in detail. FIG. 5(b) shows the timing chart for explaining the operation of the ring counter shown in FIG. 5(a), whereby (2) represents the output of the Flip-Flop $RC_{6-1}$ constituting the first bit of $RC_6$, (3) the output of the Flip-Flop $RC_{6-2}$ (4)-(15) respectively the outputs of the Flip-Flops $RC_{6-3}$-$RC_{6-14}$. When the Flip-Flop $RC_{6-1}$ produces an output as is shown in (2) in FIG. 5(b), the output is delivered to the one input of the AND gates $AND_{6-1-1}$-$AND_{6-1-4}$ shown in FIG. 5(a). The content of the 4 bit register $D1R_3$ of $D1R$ is delivered to $OR_{6-1}$-$OR_{6-4}$ through the gates and further to the segment decoder SegDEC$_1$ so as to be decoded into codes for the seven segments because $AND_{Ca1-1}$-$AND_{Ca1-4}$ are opened as mentioned above. At this time, the output of the Flip-Flop $RC_{6-1}$ of the afore mentioned ring counter is delivered to the emitter of the transistor $Tr_{7-1-1}$ shown in FIG. 6, while the output $P_T$ of the afore mentioned timer is applied to the base of $Tr_{7-1-1}$-$Tr_{7-1-14}$ so that only the transistor $Tr_{7-1-1}$ is brought into the closed state. Thus, only the seven segments connected to the transistor $Tr_{7-1-1}$ for displaying the information stored in the afore mentioned register $D1R_3$ is brought into the operable state. This is done so that by way of the content decoded to the terminal $a_1-g_1$ as the digital value to be displayed in the seven segments by means of the afore mentioned decoder $SegDEC_1$ through the OR gate $OR_{7-1}-OR_{7-7}$, the segment driver DR displays the seven segments $SS_{1-1}$. After the display by means of the segments $SS_{1-1}$, the output of the Flip-Flop $RC_{6-1}$ of the ring counter $RC_6$ is distinguished, while $RC_{6-2}$ produces an output as is shown in (3) in FIG. 5(b), which output is transmitted to the other input terminal of the AND gate $AND_{6-2-1}-AND_{6-2-4}$ whose one input terminal is connected to the output terminal of each bit of the register $D1R_4$ so as to open the gates $AND_{6-2-1}-AND_{6-2-4}$ in such a manner that the content of the register $D1R_4$ is transmitted to $AND_{Ca1-1}-AND_{Ca1-4}$ through $OR_{6-1}-OR_{6-4}$, whereby the transistor $Tr_{7-1-2}$ connected to the output terminal of the afore mentioned Flip-Flop $RC_{6-2}$ is brought into the closed state in such a manner that, in the same way as the content of the register $D1R_3$ is displayed by the seven segments $SS_{1-1}$, the content of the register $D1R_4$ is displayed by means of the seven segments $SS_{1-2}$ connected to the transistor $Tr_{7-1-2}$ only during the time when the Flip-Flop $RC_{6-2}$ produces an output. After that, in synchronization with the output of the Flip-Flop $RC_{6-3}-RC_{6-14}$, the content of the register $D1R_5-D1R_{16}$ is successively displayed by means of the segment $SS_{1-2}-SS_{1-14}$ in a time series. When the display by means of $SS_{1-14}$ has been terminated, the content of the register $D1R_3-D1R_{16}$ is again displayed by means of $SS_{1-1}-SS_{1-14}$ repeatedly in such a manner that the display element for printing consisting of the seven segments $SS_{1-1}-SS_{1-14}$ displays the data stored in the register D1R so as to print the data stored in the register D1R on the film. While the data printing is carried out by means of the segments $SS_{1-1}-SS_{1-14}$ as mentioned above, the integral circuit shown in FIG. 8(a) and (b) integrates the $Q_A$ output of $FF_A$ shown in FIG. 7(a) until the integration reaches a certain determined value, when ININT produces a "0" so that the output of the integration circuit INT is inverted so as to bring the AND gate $AND_{8-1}$ in a closed state. Thus, the $P_T$ output is extinguished, the gates $AND_{Ca1-1}-AND_{Ca1-4}$ are closed and the transmission of the content of the register D1R is stopped while the transistors $Tr_{7-1-1}-Tr_{7-1-14}$ connected to the seven segments $SS_{1-1}-SS_{1-14}$ are opened so as to stop the data printing operation. Further, when the data printing operation is stopped, the integration circuit INT shown in FIG. 8(a) is inverted as mentioned afore, so that the signal delivered from the timer $T1M_{4-1}$ shown in FIG. 4(a) to the OR gate $OR_{4-6}$ through the terminal N is extinguished. Thus, when the data printing time is shorter than the time during which $RSFF_2$ produces the Q output, namely the photographing time, $OR_{4-6}$ produces an output so that the release operation of the camera $Ca_1$ is continued. Further, when the data printing time is longer than the photographing time, the timer $T1M_{4-1}$ continues to produce the output until the data printing operation is completed even after the Q output of $RSFF_2$ is extinguished so that $OR_{4-6}$ still produces the output. Thus, the release operation to the camera $Ca_1$ is maintained until the data printing operation is terminated even after the termination of photographing so that when the camera is mounted on the motor drive device and set for photographing picture by picture, the release is maintained until the data printing is terminated, although the film is generally wound up by means of the stop of the release operation. Thus, the film is not wound up before the termination of the data printing. So far, the data printing only in the camera $Ca_1$ is explained. Below, the simultaneous data printing in the cameras $Ca_1$ and $Ca_2$ will be explained. When the data from the register D1R, D2R is respectively printed in the camera $Ca_1$ and $Ca_2$, at the time point $t_1$ at which the $P_1$ output is produced and delivered to the input terminal $P'_1$ so as to set $FF_A$, to produce the $Q_A$ output and to print the content of the register D1R on the film if the control circuit $M_1$ produces the data printing operation signal $P_2$ for the camera $Ca_2$ while the circuit $M_1$ is producing the data printing operation signal $P_1$ for the camera $Ca_1$ as is shown in (4) and (5) in FIG. 7(b). When at the time point $t_2$ during the printing operation of the data stored in the register D1R the $P_2$ output is produced by the control circuit $M_2$, in synchronization with the clock pulses CP, $FF_A$ is reset while $FF_B$ is set in such a manner that, at every delivery of the clock pulse to $FF_A$ and $FF_B$, the $Q_A$ output and the $Q_B$ output are produced alternatively as is shown in (6) and (7) in FIG. 7(b). When the $Q_A$ output is changed over to the $Q_B$ output in the above mentioned process, the timer corresponding to the timer $TIM_{4-1}$ for controlling the data printing time for the camera $Ca_2$ produces the $P_T$ output in the same way as $TIM_{4-1}$ produces the $P_T$ output by means of the $Q_A$ output so that the gates $AND_{Ca2-1}-AND_{Ca2-4}$ shown in FIG. 6 are opened while at the same time the $P_T$ output is applied to the base of the transmitter $Tr_{7-2-1}-Tr_{7-2-14}$ for driving the data printing seven segments $SS_{2-1}-SS_{2-14}$ in the camera $Ca_2$. Further, because the output of the afore mentioned ring counter $RC_6$ is delivered to the transmission circuit $F_2$ for the camera $Ca_2$, the content of the register $D2R_3-D2R_{16}$ is displayed by means of the seven segments $SS_{2-1}-SS_{2-16}$ in a time series in synchronization with one output of the Flip-Flop constituting the bit of the afore mentioned ring counter in the same way as the content of the afore mentioned register D1R is displayed by means of the seven segments $SS_{1-1}-SS_{1-14}$ for the camera $Ca_1$. Further, because the $Q_A$ output is produced again at the time point at which the data printing with the seven segments $SS_{2-1}-SS_{2-14}$ by means of the $Q_B$ output has been terminated, the content of the register D1R is again displayed by means of the seven segments. Namely the seven segments $SS_{1-1}-SS_{1-14}$ and $SS_{2-1}-SS_{2-14}$ display the contents of the registers D1R and D2R alternatively in synchronization with the $Q_A$ and $Q_B$ output. When the $Q_A$ output is integrated by means of the integrating circuit INT of the timer $TIM_{4-1}$ up to a certain determined amount as mentioned afor during the above mentioned data printing operation, the output of the timer is inverted to extinguish the $P_T$ output and close the gates AND, $AND_{Ca1-1}-AND_{Ca1-4}$, while at the same time the transistors $Tr_{7-1-1}-Tr_{7-1-14}$ are brought into the non-operable state, the seven segments $SS_{1-1}-SS_{1-14}$ are brought into the non-operable state and the data printing operating of the content of the register D1R is stopped. Further, if at this time the photographing time of the camera $Ca_1$ is terminated while the Q output of $RSFF_2$ is extinguished, the $P_1$ output is also extinguished and therefore the input signal exits only at the input terminal $P_2$ of TDC shown in FIG. 7(a). Thus, at the time point $t_3$, $FF_B$ continues to produce the output B in such a manner that the content of the register D2R is displayed by means of the seven segments $SS_2$-

1-$SS_{2-14}$ so as to print the data on the film until the output B is integrated up to a certain determined value by means of the timer for the camera $Ca_2$. Further, when the content of the register D1R, D2R and D3R is printed in the camera $Ca_1$, $Ca_2$ and $Ca_3$ at the same time, the data is printed with the timing shown in (8)-(13) in FIG. 7(b) in the same way as mentioned above.

Figure 9:
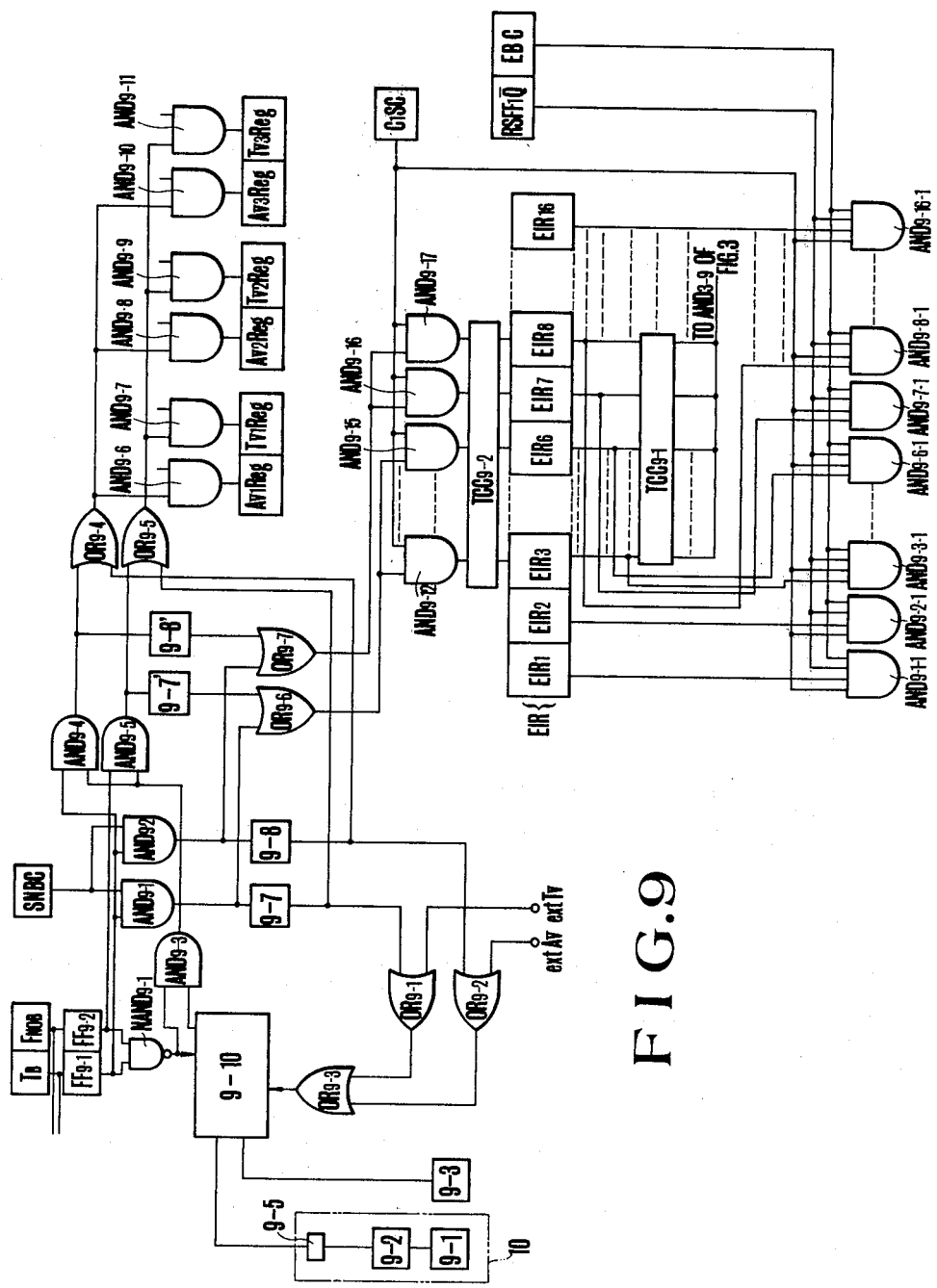
FIG. 9 shows a circuit diagram of an embodiment of the exposure control operation circuit of the control device in accordance with the present invention.

FIG. 9 shows an embodiment of the operational circuit for the exposure control of the control device in accordance with the present invention, whereby 9-1 is the photoelectric converter including a photosensitive element such as a photo voltaic element for sensing the light beam from the object so as to produce the voltage corresponding to the object brightness, 9-2 the logarithmic compression means for logarithmically compressing the output of the photoelectric converter 9-2 so as to form a voltage corresponding to the logarithmically compressed value Bv of the object brightness, and 9-5 the A-D converter for converting the output into a digital value, whereby 9-1, 9-2, 9-5 constitute the light measuring circuit 10 shown in FIG. 1. 9-3 is the digital switch means functionally engaged with the film sensitivity setting dial ASAD shown in FIG. 2 so as to form the logarithmically compressed value Sv of the ASA information set by the dial and TB is the key button selecting the shutter priority mode shown in FIG. 2, so designed that by means of the operation of the key button TB, the Flip-Flop $FF_{9-1}$ produces an output: FNOB is the key button for selecting the aperture priority mode shown in FIG. 2, which is so designed that by operating the key button FNOB, the Flip-Flop $FF_{9-2}$ produces an output, whereby $FF_{9-1}$ and $FF_{9-2}$ are so connected that either one of them produces an output. $NAND_{9-1}$ is the NAND gate connected to the output terminal of $FF_{9-1}$ and $FF_{9-2}$ and $AND_{9-1}$ and $AND_{9-2}$ are the AND gates, whose input terminals are connected to the output terminals of $FF_{9-1}$ and $FF_{9-2}$ as well as SNBC producing a digital value corresponding to the set numerical value in functional engagement with the number setting key shown in FIG. 2. 9-7 is the code converting circuit connected to the afore mentioned $AND_{9-1}$ so as to convert the digital value corresponding to the shutter time produced by the afore mentioned SNBC into a logarithmically compressed digital value, 9-8 the code converting circuit connected to the afore mentioned $AND_{9-2}$ to convert the digital value corresponding to the aperture value produced by SNBC into a logarithmically compressed digital value and $OR_{9-1}$ and $OR_{9-2}$ the OR gates whose other input terminal is connected to the code converting circuits 9-7, 9-8. The other input terminal of $OR_{9-1}$, $OR_{9-2}$ is connected to the camera $Ca_1$–$Ca_3$, presenting the terminals extAv, extTv for the shutter time value or the aperture value coming from the cameras. $OR_{9-3}$ is the OR gate connected to $OR_{9-1}$, $OR_{9-2}$. 9-10 is the operation circuit connected to $OR_{9-3}$, 9-5 and 9-6 so as to operate the digital values corresponding to Tv, Av, Sv and Bv produced by them, whereby the operation circuit presents the adder for adding the digital values corresponding to Bv, St produced by 9-5, 9-6 and subtracter for subtracting the digital value corresponding to Tv or Av delivered through $OR_{9-3}$ from the output of the adder so as to produce the digital value corresponding to Tv or Av. $AND_{9-3}$ is the AND gate connected to the output terminal of the afore mentioned NAND gate $NAND_{9-1}$ and the operation circuit 9-10. $AND_{9-4}$ and $AND_{9-5}$ are the AND gates, whereby the input terminal of $AND_{9-4}$ is connected to the output terminal of $FF_{9-1}$ and $AND_{9-3}$ while the input terminal of $AND_{9-5}$ is connected to the output terminal of $FF_{9-2}$ and $AND_{9-3}$. $OR_{9-4}$, $OR_{9-5}$ are the OR gates, whereby the input terminal is connected to the output terminal of $AND_{9-4}$ and 9-8. The input terminal of $OR_{9-5}$ is connected to the output terminal of $AND_{9-5}$ and 9-7 in such a manner that $OR_{9-4}$ produces the digital value corresponding to Tv while $OR_{9-5}$ produces the digital value corresponding to Av. $AND_{9-6}$–$AND_{9-11}$ are the AND gates, whereby the one input terminal of $AND_{9-6}$, $AND_{9-8}$ and $AND_{9-10}$ is connected to $OR_{9-4}$, while the other input terminal of $AND_{9-6}$ is connected to $C_1SC$. Further, the other input terminal of $AND_{9-8}$ is connected to $C_2SC$, while the other input terminal of $AND_{9-10}$ is connected to $C_3SC$. Further, the one input terminal of $AND_{9-7}$, $AND_{9-9}$, $AND_{9-11}$ is connected to $OR_{9-5}$, while the other input terminal of $AND_{9-7}$ is connected to $C_1SC$, the other input terminal of $AND_{9-9}$ to $C_2SC$ and the other input terminal of $AND_{9-11}$ to $C_3SC$. $Av_1Reg$ is the register connected to $AND_{9-6}$, to store the aperture control information for the camera $Ca_1$. $Tv_1Reg$ is connected to $AND_{9-7}$ to store the shutter control information for the camera $Ca_1$. Further, $Av_2Reg$ and $Tv_2Reg$ are the registers respectively connected to $AND_{9-8}$ and $AND_{9-9}$ so as to store the control information for the camera $Ca_2$. $Av_3Reg$ and $Tv_3Reg$ are the registers respectively connected to $AND_{9-10}$ and $AND_{9-11}$ to store the control information for the camera $Ca_3$.

9-7' and 9-8' are the code converters for converting the delivered digital values into the logarithmically prolonged digital code while $OR_{9-6}$ and $OR_{9-7}$ are the OR gates. The one input terminal of $OR_{9-6}$ is connected to 9-7', while the other input terminal is connected to $AND_{9-1}$. The input terminal of $OR_{7-7}$ is connected to 9-8' and $AND_{9-2}$. $AND_{9-12}$–$AND_{9-17}$ are the AND gates, whereby the one input terminal of $AND_{9-12}$–$AND_{9-15}$ is connected to $OR_{9-6}$ while the other input terminal is connected to $C_1SC$. Further the one input terminal of $AND_{9-15}$, $AND_{9-17}$ is connected to $OR_{9-7}$ while the other input terminal is connected to $C_1SC$.

E1R is the register shown in FIG. 1, consisting of 4 bit registers $E1R_1$–$E1R_{16}$, whereby the digital value "0 0 0 1" is stored in each bit of the register $E1R_1$. Further, in the register $E1R_2$, the digital value "1 1 1 0" representing the exposure mode is stored. Further, the registers $E1R_3$–$E1R_6$ are respectively connected to the afore mentioned AND gates $AND_{9-12}$–$AND_{9-15}$ so as to store the shutter time information. Further $E1R_7$, $E1R_8$ are connected to the AND gates $AND_{9-16}$, $AND_{9-17}$ so as to store the aperture information. E2R and E3R are composed in the same way as E1R.

$TCC_{9-1}$ is the transmission control circuit connected to the afore mentioned registers $E1R_3$–$E1R_8$ whereby the output of $TCC_{9-1}$ is connected to the AND gate $AND_{3-9}$ shown in FIG. 3 in such a manner that by means of the operation of EXB and PB shown in FIG. 2, the content of $E1R_3$–$E1R_8$ is delivered to $D1R_3$–$D1R_8$ by means of the AND gate $AND_{3-9}$ in a time series. $AND_{9-1-1}$–$AND_{9-16-1}$ are the AND gates whose input terminals are respectively connected to the output terminals of $E1R_1$–$E1R_6$ and the Q outputs of $C_1SC$, EBC and $RSFF_1$. Further, the output terminals of $AND_{9-1-1}$–$AND_{9-16-1}$ are respectively connected to the input termina of the OR gates $OR_{1-1}$–$OR_{1-16}$ shown in FIG. 3. In the drawing, only the data transmission gates of the register E1R for the camera $Ca_1$ is shown, and E2R and E3R are connected to D2R and D3R in the same way.

Below, the display of the exposure value and the operation at the data printing mode will be explained in accordance with FIG. 9. At first, the case with the shutter priority mode will be explained.

By means of operating the key button TB shown in FIG. 2, the Flip-Flop $FF_{9-1}$ shown in FIG. 9 produces an output, which output is applied to the one input terminal of the AND gate $AND_{9-1}$. The desired shutter time is thus converted into a digital value with SNBC by means of operating the number setting key shown in FIG. 2 and transmitted to the code converting circuit 9-7 through the AND gate $AND_{9-1}$. The digital shutter time is converted by means of 9-7 into the logarithmically compressed digital value and delivered to the operation circuit 9-10 through the OR gates $OR_{9-1}$ and $OR_{9-3}$. Further, the photoelectric converting circuit 9-1 produces the voltage corresponding to the object brightness which output voltage is logarithmically compressed by means of the logarithmically compressing means 9-2 so as to be converted into the voltage Bv corresponding to the logarithm of the object brightness, digitalized by means of the A-D converting circuit 9-5 and delivered to the operation circuit 9-10.

Further to the operation circuit 9-10, the digital value of the information Sv of the logarithmically compressed ASA sensitivity set by means of the film sensitivity setting dial ASAD shown in FIG. 2 is delivered. The digital values delivered to the operation circuit 9-10 corresponding to Bv and Sv are added in the adding circuit into a resultant digital value corresponding to $Bv+Sv$, while by means of the subtracting circuit, in the operation circuit the digital value delivered to the operation circuit corresponding to Tv is subtracted from $Bv+Sv$, and the output $Bv+SV-Tv(=Av)$ is produced. The Av value is delivered to the one input terminal of the AND gate $AND_{9-3}$, while the output produced by the $NAND_{9-1}$ based upon the fact that only $FF_{9-1}$ produces an output is delivered to the other input terminal of the AND gate $AND_{9-3}$ so as to open the gate $AND_{9-3}$ in such a manner that the Av value is delivered to the AND gates $AND_{9-4}$. Gates $AND_{9-4}$ have one input terminal connected to $FF_{9-1}$ through $AND_{9-3}$, and to $OR_{9-4}$ through $AND_{9-4}$ whereby $OR_{9-4}$ produces the digital value corresponding to the Av value. When it is desired to take a photograph with shutter priority mode only with the camera $Ca_1$, the key button $C_1SB$ shown in FIG. 2 is pushed down. By means of this operation, $AND_{9-6}$ is opened in such a manner that the digital value corresponding to the Av value delivered at the output terminal of $OR_{9-4}$ is delivered to the register $Av_1Reg$ for storing the aperture control information for the camera $Ca_1$ through $AND_{9-6}$, whereby the aperture value is stored. Further, as mentioned before the code converting circuit 9-7 produces the digital value corresponding to Tv, whose information is stored in the register $Tv_1Reg$ for storing the shutter time control information for the camera $Ca_1$ through $OR_{9-5}$ and $AND_{9-7}$.

Further, the shutter time information T delivered to 9-7 through the afore mentioned $AND_{9-4}$ at the time of number setting is delivered to the registers $E1R_3-E1R_6$ by means of the transmission control circuit $TCC_{9-2}$ in time series through the AND gates $AND_{9-12}-AND_{9-15}$ opened by means of operating the afore mentioned $C_1SB$ through $OR_{9-6}$. Further in $E1R_7-E1R_8$, the aperture value information is stored as a result of the Av value being delivered to the register $Av_1Reg$, and the Av value delivered through the afore mentioned $AND_{9-4}$ being logarithmically prolonged by means of the code converting circuit 9-8' into A which is transmitted to the opened gates $AND_{9-16}$ and $AND_{9-17}$ through $OR_{9-7}$. This is the case when the exposure information are stored in the registers $Av_1Reg$, $Tv_1Reg$ and E1R for storing the control information for the camera $Ca_1$. In the case of photographing with shutter time priority of the cameras $Ca_2$ and $Ca_3$, the key buttons $C_2SB$ and $C_3SB$ are operated successively whereby the exposure informations are delivered to the registers $Av_2Reg$, $Tv_2Reg$, E2R, $Av_3Reg$, $Tv_3Reg$ and E3R. By means of the above mentioned process, the exposure information is stored in all the registers in such a manner that the exposure of the cameras $Ca_1$, $Ca_2$ and $Ca_3$ is controlled with the exposure information stored in the registers $Av_1Reg$, $Av_2Reg$, $Tv_1Reg-Tv_3Reg$. Further, when the information stored in E1R-E3R is displayed or printed on the film, the print key PB and the exposure key EXB shown in FIG. 2 are operated, whereby the Q output terminal of EBC and $RSFF_1$ delivers an output as is shown in FIG. 3, which output is transmitted to the AND gate $AND_{3-9}$ and the AND gates corresponding to $AND_{3-9}$ in 2-2 and 2-3 in such a manner that the content of the registers E1R, E2R and E3R is transmitted to the registers D1R, D2R and D3R. Namely, the content of the register E1R is transmitted to the AND gate $AND_{3-9}$ and the AND gate $AND_{3-6-6}$ through the OR gate $OR_{3-2}$ shown in FIG. 3 by means of $TCC_{9-1}$ in a time series in such a manner that in functional engagement with $TCC_{9-1}$, $TCC_2$ successively connects $OR_{3-1-1}-OR_{3-1-6}$ to the registers $D1R_3-D1R_8$ so as to deliver the content of E1R to D1R, whereby by means of the afore mentioned data printing operation, the stored exposure information is printed on the film in the camera $Ca_1$. Further, the content of the registers E2R and E3R is stored in the registers D2R and D3R and printed on the film. Further, before the print key PB has been operated, the AND gates $AND_{9-1-1}-AND_{9-16-1}$ are opened by means of operating the key button $C_1SB$ in such a manner that the exposure information stored in the register E1R are successively delivered to the display circuit 12 through $OR_{1-1}-OR_{1-16}$ for display.

Figure 11:
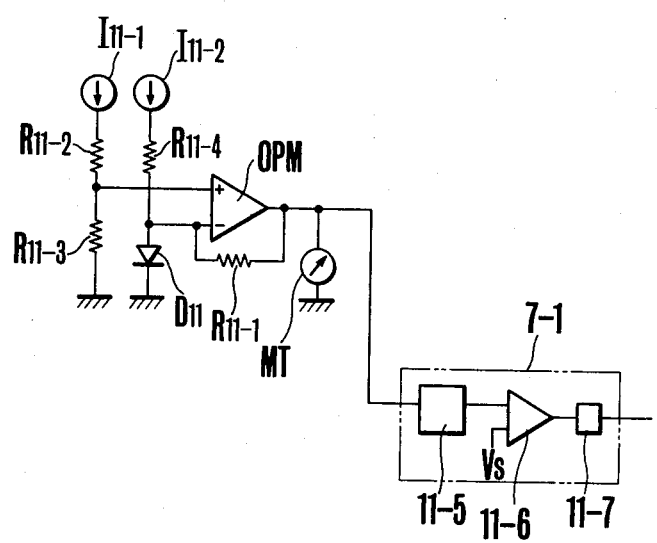
FIG. 11(a) shows a circuit diagram of an embodiment of the external control unit and S, E shown in FIG. 1.
FIG. 11(b) shows a circuit diagram of an embodiment of the digital counter 4 shown in FIG. 11(a), whereby the counter acts as a digital clock.
FIG. 11(c) shows a circuit diagram of an embodiment of the analog measuring instrument 11-1 shown in FIG. 11(a), whereby a thermometer is used as the analog measuring instrument 11-1.

FIGS. 10 and 11 respectively show a circuit diagram of an embodiment of the circuit for automatically controlling the starting time and the termination time of the control device in accordance with the present invention and of the afore mentioned external control unit, whereby in FIG. 10, 10-1 is the Flip-Flop for producing the Q output in functional engagement with the starting information input key STB' and the Q output in functional engagement with the termination information input key FNDB shown in FIG. 2. SER is the register consisting of 4 bit registers $SER_1-SER_{14}$. $AND_{10-1}-AND_{10-6}$ is the AND gate having one input terminal connected to the Q output of 10-1, and having another input terminal is connected to SNBC and having an output terminal connected to the control circuit $TCC_3$ for controlling an operation such that the AND gate is connected to a certain determined register out of $SER_3-SER_8$. $AND_{10-7}-AND_{10-12}$ is the AND gate having one input terminal connected to the Q output of 10-1, having another input terminal connected to the afore mentioned SNBC and having an output terminal connected to the control circuit $TCC_4$ for successively connecting $AND_{10-7}-AND_{10-12}$ to the afore mentioned registers $SER_9-SER_{14}$ in functional engagement with the operation of the number setting key.

AND$_{10-13}$ is the AND gate having one input terminal connected to the Q output and having another input terminal is connected to the 4 bit register Freg storing the digital value "1 1 0 0" representing start. AND$_{10-14}$ is the AND gate having one input terminal connected to the Q output of 10-1 and having another input terminal is connected to the 4 bit register Greg storing the digital value "1 1 0 1" representing the termination. OR$_{10-1}$ is the OR gate having an input terminal connected to the AND gates AND$_{10-13}$, AND$_{10-14}$ and having an output terminal connected to the afore mentioned registers SER$_2$. AND$_{10-15}$–AND$_{10-20}$ is the AND gate having one input terminal connected to the Q output of 10-1 and having another input terminal connected to register SER$_3$–SER$_8$, AND$_{10-21}$–AND$_{10-26}$ (the AND gate having one input terminal which is connected to the Q output of 10-1 and whose other input terminal is connected to the afore mentioned register SER$_9$–SER$_{14}$), AND$_{10-27}$ (the AND gate having one input terminal connected to the Q output of 10-1 and having another input terminal connected to the register SER$_2$) and AND$_{10-28}$ (the AND gate having one input terminal connected to the Q output of 10-1 and having another terminal connected to the register SER$_2$). The AND gates AND$_{10-15}$–AND$_{10-28}$ are respectively connected to the OR gates OR$_{1-2}$–OR$_{1-14}$ shown in FIG. 3.

Figure 11A:
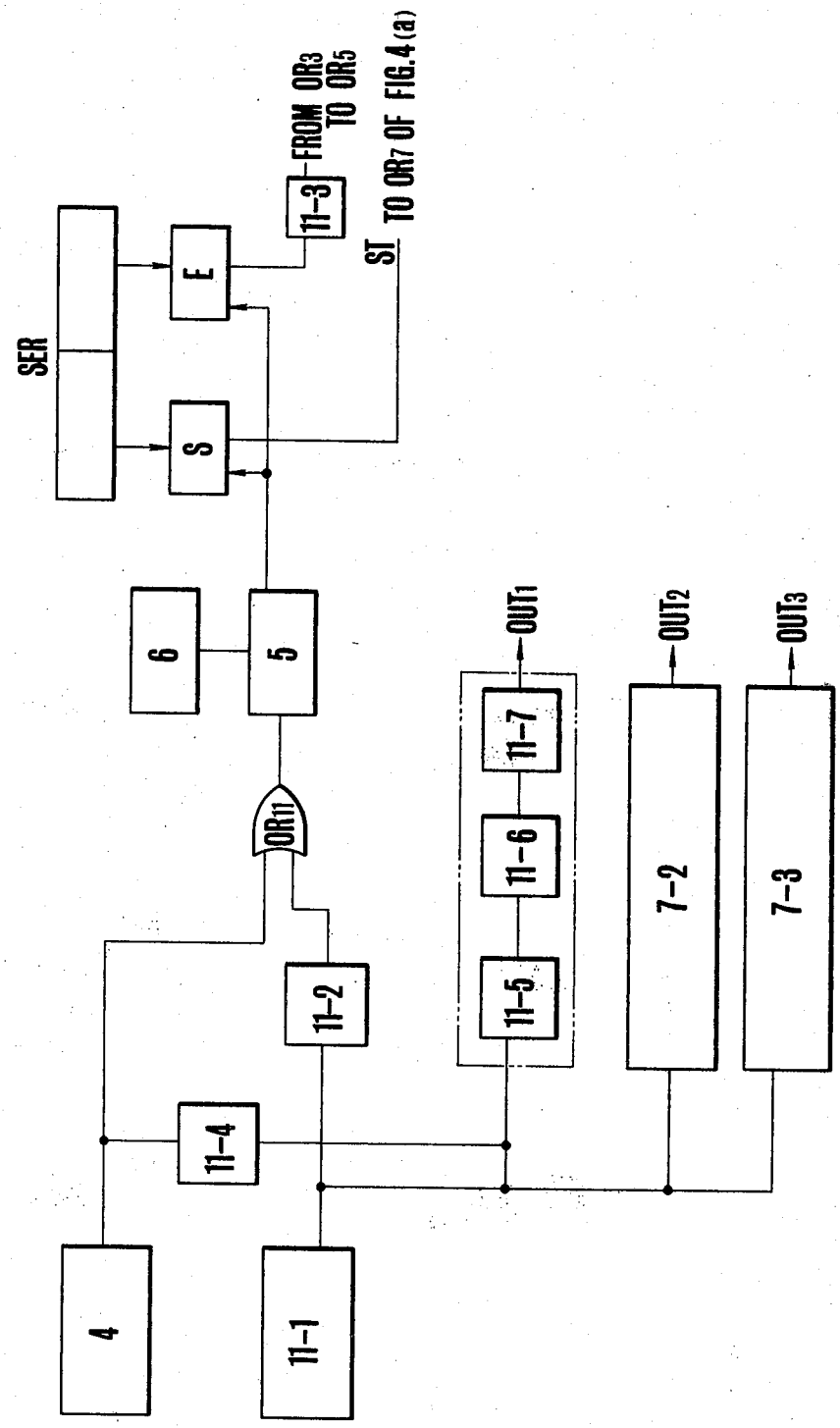

FIG. 11(a) shows a block diagram of an embodiment of the external control unit in a dotted line, whereby 4 is the digital measuring instrument such as digital clock shown in FIG. 3 and 3 for producing a digital value, OR$_{11}$ the OR gate and 5 the register shown in FIG. 1 for storing the digital value delivered through OR$_{11}$. 6 is the display device shown in FIG. 1 and FIG. 3 for displaying the content of the register 5. 11-1 is the analog measuring instrument, and 11-2 the A-D converter for converting the analog output of the analog measuring instrument into a digital value, whereby the output of the A-D converter is connected to the OR gate OR$_{11}$. S is the operation start control circuit shown in FIG. 1, which connects the afore mentioned register 5 to the registers SER$_3$–SER$_8$ of SER so as to produce the ST signal when the content of SER$_3$–SER$_8$ coincides with that of the register 5. E is the operation stop control circuit shown in FIG. 1 which connects the register 5 with the register SER$_7$–SER$_{14}$ so as to produce an output when the content of 5 coincides with that of SER$_7$–SER$_{14}$ in such a manner that the Flip-Flop 11-3 is set to produce the Q output. 11-4 is the D-A converter and 7-1 the break-in photographing control circuit shown in FIG. 1 and FIG. 4(a), which includes the differentiating circuit 11-5, the level detector 11-6 and the monostable multivibrator 11-7. The detection level of the level detector and the time during which the monostable multivibrator is switched on are adjustable at the desired values by means of the dials (not shown) in the drawing. 7-2 and 7-3 are the break-in photographing control circuit shown in FIG. 1, being constituted in the same way as 7-1. Further, the output terminal of the afore mentioned operation start control circuit S is connected to the OR gate OR$_7$ shown in FIGS. 1 and 4, while the output terminal of 11-3 is connected to the OR gates OR$_3$–OR$_5$ shown in FIG. 1. Further the output terminals OUT$_1$–OUT$_3$ of 7-1–7-3 are respectively connected to the OR gates OR$_{4-7}$ of M$_1$–M$_3$.

Below the operation of the external control unit shown in FIGS. 10 and 11(a) will be explained. When now the key CR shown in FIG. 2 is operated while the key PB and CSB are operated, the Q outputs of CBC,CSC and RSFF shown in FIG. 3 produce a "1" so that the AND gate AND$_{3-10}$ produces an output. The Flip-Flop FF$_2$ also produces an output in such a manner that AND$_{3-7-1}$–AND$_{3-7-6}$ are opened whereby the digital information is delivered from 4 to the registers D1R$_3$–D1R$_8$. The information from 4 is also delivered to the registers D2R$_3$–D2R$_8$, D3R$_3$–D3R$_8$ the information. When in the above mentioned state the key STB' shown in FIG. 2 is operated, 10-1 shown in FIG. 10 produces the Q output which is delivered to the one input terminal of AND$_{10-13}$ and AND$_{10-1}$–AND$_{10-6}$. When the number setting key shown in FIG. 2 is operated, at each operation of the number setting key AND$_{10-1}$–AND$_{10-6}$ are successively connected to SER$_3$–SER$_8$ by means of the operation of TCC$_3$ in such a manner that the desired operation start information is successively delivered to the registers SER$_3$–SER$_8$. Further, when ENDB shown in FIG. 2 is operated, 10-1 produces the Q output which output is applied to the one input terminal of AND$_{10-7}$–AND$_{10-12}$ in such a manner that the termination information is delivered to SER$_9$–SER$_{14}$ in the same way as the information is delivered to SER$_3$–SER$_8$ by means of the number setting key. When only the digital measuring instrument 4 shown in FIG. 11 is used as the external measuring instrument, the analog measuring instrument 11-1 is to be removed. In this state, the digital output of the measuring instrument 4 is delivered to the register 5 through the OR gate OR$_{11}$ so as to be displayed by circuit 6. When the output of the digital measuring instrument coincides with the start information stored in SER$_3$–SER$_8$ of SER, the operation start control circuit S produces the output ST which is delivered to the OR gate OR$_7$ shown in FIG. 4(a) so as to trigger the one shot multivibrator OS$_1$ of M$_1$, M$_2$ and M$_3$ in such a manner that, in the same way as in the sequential control mode to be explained later, the sequential control of photographing is started in accordance with the sequential control information stored in the register C1R–C3R. When the output of the digital measuring instrument 4 coincides with the digital value stored in the register SER$_9$–SER$_{14}$ after the control device in accordance with the present invention has been started by means of the output ST of the operation start control circuit S as mentioned above, the operation stop control circuit E produces an output to set the Flip-Flop 11-5 shown in FIG. 11. Thus, the Flip-Flop 11-3 produces an output which is delivered to the OR gates OR$_3$–OR$_5$ shown in FIG. 1 in such a manner that, through the OR gates OR$_3$–OR$_5$, the output of the Flip-Flop 11-3 is delivered to the OR gates corresponding to OR$_{4-5}$ of M$_1$ shown FIG. 4(a) out of M$_1$–M$_3$. Thus, in the same way as at the time of the sequential control mode, the inhibit AND IAND$_{4-2}$ shown in FIG. 4(a) is kept in the closed state, the operation of M$_1$ is stopped by means of the operation at the time of the afore mentioned sequential control mode. Further, when the operation of M$_2$ and M$_3$ is stopped, the operation of the control device is terminated. Further, while the control is carried out by means of the above mentioned control unit, the output of the digital measuring unit 4 is converted by means of the D-A converter 11-4 into an analog amount corresponding to the digital output of the digital measuring instrument which analog amount is applied to the differentiating circuit 11-5 so that when the output of the D-A converter changes abruptly, namely when the output of the digital measuring instrument 4 changes abruptly, the differential circuit 11-5 of the break-in photographing control circuit 7-1, 7-2 and 7-3 produce a high output. This output is compared with the level set at the level detector in such a manner that when the output of the differenciating circuit is larger than the level set at the level detector, the level detector 11-6 produces an output so as to trigger the monostable multivibrator 11-7 and produce the output $OUT_1$. Further, at this time, 7-2 and 7-3 produce the outputs $OUT_2$ and $OUT_3$ in the same way. The outputs are delivered to $M_1$, $M_2$ and $M_3$ shown in FIG. 1. Below, the operation when $OUT_1$ is delivered to $M_1$. $OUT_1$ from 7-1 shown in FIG. 4 is delivered to the OR gate $OR_{4-6}$ through the OR gate $OR_{4-7}$. Thus in sequential control mode, $OR_{4-6}$ produces an output even if the camera $Ca_1$ is not ready for photographing so as to deliver the photographing signal $R_1$ to the camera Ca and drive the camera $Ca_1$ to take a photograph while $AND_{4-4}$ produces an output so that the information delivered to the register $D1R_3$–$D1R_8$ and corresponding to the output of the digital measuring instrument 4 of the external control unit is printed on the film in the camera $Ca_1$ in the same way as in the case of the afore mentioned data printing mode. Further, when the data is printed by means of the external control unit, the output $R_1$ is, if produced, delivered to $AND_{2-7-1}$–$AND_{3-7-6}$ through $IN_{3-2}$ shown in FIG. 3 in such a manner that the digital value of the digital measuring instrument 4 is not changed at the time of photographing, namely at the time of printing the data. Further, $M_2$ and $M_3$ are controlled in the same way so as to carry out the photographing while the information delivered to D2R and D3R is printed on the films in the camera $Ca_1$ and $Ca_2$.

Further, in the case when the analog measuring device 11-1 is used when the digital measuring device is removed, the output of the analog measuring device 11-1 is converted by means of the A-D converter into a digital amount in such a manner that the same operation is carried out as when the digital measuring instrument 4 is used.

Figure 11B:
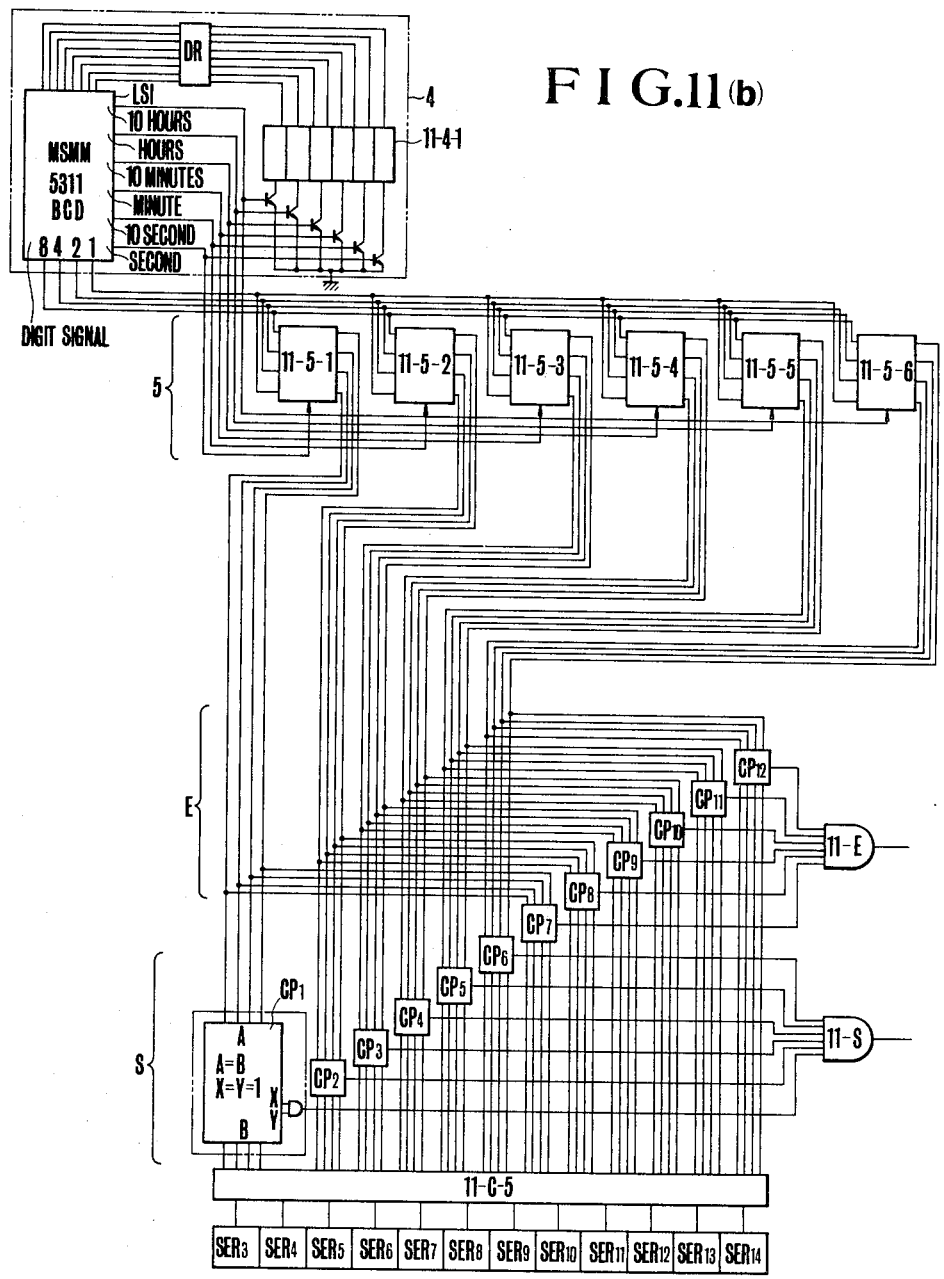

FIG. 11(b) shows a circuit diagram of an embodiment, whereby the digital clock is adopted as the digital measuring instrument 4 shown in FIG. 11(a), whereby element 4 (as shown in a dotted line) is a digital clock including the IC (MSMM5311 of National Semiconductor Corporation), an LSI constituting a part of the conventional digital clock, the driver DR and the seven segment display device 11-4-1. Circuits 11-5-1–11-5-6 are the latch circuits constituting the register 5 shown in FIG. 11(a). 11-C-5 is the converter converted to the output terminal of $SER_3$–$SER_{14}$ constituting the register SER so as to convert the content of SER into a parallel signal, being constituted in the same way as $C_{4-3}$ shown in FIG. 4(c). $CP_1$–$CP_6$ are the 4 bit magnitude comparators so designed that the output terminals X and Y deliver "1" only when the 4 bit input at the input terminal A coincides with the 4 bit input at the input terminal B while the AND gate, having input terminals connected to the output terminals X and Y deliver the output "1" only when the inputs at A and B coincides with each other. Part type 8269 of Signetics can be used as the comparator, for example. 11-S is the AND gate whose input terminal is connected to the output terminals of the comparators, $CP_1$–$CP_6$, constituting the afore mentioned operation start control circuit S together with the comparators $CP_1$–$CP_6$. $CP_7$–$CP_{12}$ are the comparators constituted in the same way as the afore mentioned comparator $CP_1$, constituting the operation stop control circuit E together with the AND gate 11-E. Below, the start operation and the stop operation of the afore mentioned sequential control by means of the digital clock will be explained in accordance with FIG. 11(b) and FIG. 10. At first, a certain determined time for starting the photographing is set in the registor $SER_3$–$SER_8$ in hour, minute and second while the time for stopping the photographing is set in $SER_9$–$SER_{14}$ in hours, minutes and seconds. When the time for starting the photographing and the time for stopping the photographing are set in the registers in this way, the data set in each register $SER_3$–$SER_{14}$ is converted into a parallel signal to be delivered to the B input terminal of the comparater $CP_1$–$CP_{12}$. On the other hand, the hours, the minutes and the seconds are displayed on the segment display device 11-4-1 by means of a digital clock 4 in a conventional way while the digital value corresponding to the time is delivered to the latch circuits 11-5-1–11-5-6. These circuits have outputs which are respectively delivered to the A input terminal of the comparator $CP_1$–$CP_{12}$. Thus, when the time of the digital clock coincides with the start time set in the registers $SER_3$–$SER_8$, all of the comparator $CP_1$–$CP_6$ produce "1", whereby the AND gate 11-5 produces a "1". This is done only at the time when an output is delivered to the OR gate $OR_7$ shown in FIG. 4(a) in such a manner that by means of the above mentioned operation the sequential control is started so as to carry out the photographing. When the time of the digital clock coincides with the termination time set in the register $SER_9$–$SER_{14}$ while the afore mentioned sequential control of the photographing is carried out in this way, all of the comparators $CP_7$–$CP_{12}$ produce the output "1" whereby the AND gate 11-E also produce "1". Thus, the Flip-Flop 11-3 shown in FIG. 11(a) is set, the output is delivered to the OR gate $OR_{4-5}$ shown in FIG. 11(a) through the $OR_3$ shown in FIG. 1 in such a manner that the sequential control is stopped. When as the a digital clock is used as the external measuring instrument, the sequential control, namely the start and the termination of the photographing can be automatically controlled.

FIG. 11(c) shows a circuit diagram of an embodiment in which, for the analog measuring instrument 11-1 shown in FIG. 11(a), a thermometer is used, whereby $I_{11-1}$ and $I_{11-2}$ are the constant current source, $R_{11-2}$ and $R_{11-3}$ the resistance constituting the standard voltage source together with $I_{11-1}$, $R_{11-4}$ the resistance, $D_{11}$ the diode whose terminal voltage changes about 2 mV for the change of 1° C., $R_{11-2}$–$R_{11-4}$ and $D_{11}$ constitute the thermometer as the analog measuring instrument 11-1 together with the operational amplifier OPm in having resistance $R_{11-1}$ as a feedback element and having an input terminal connected to the output terminal of the bridge circuit and the meter MT connected to the output terminal of the operational amplifier OPm. 11-6 is the comparison circuit as the level detector whose one input terminal is supplied with the standard voltage Vs to be compared with the output of the differential circuit in such a manner that when the output of the differentiating circuit 11-5 is higher than Vs the level detector produces the output "1" so as to trigger the monostable multivibrator 11-7. The circuit being constructed as mentioned above, operates so that when the temperature changes abruptly, the differentiating circuit 11-5 produces a differentiated pulse higher than Vs while the comparison circuit 11-6 produces a "1" and the monostable multivibrator 11-7 produces an output for a certain determined time. Thus the output $OUT_1$ is produced so as to produce $R_1$ through the OR gates $OR_{4-7}$ and $OR_{4-6}$ shown in FIG. 4(a) and carry out the release operation. Thus, when the temperature of the ambient photographic condition changes abruptly, the photographing is carried out automatically. The present embodiment is so designed that the photographing is carried out when the temperature changes. It is also possible to carry out the photographing when the noise changes abruptly.

Figure 12:
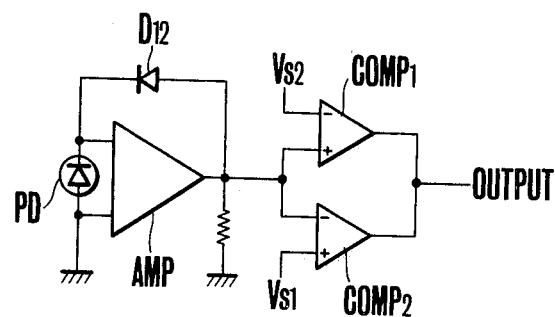
FIG. 12(a) shows a circuit diagram of an embodiment of the abnormal signal forming circuit EM shown in FIG. 1.
FIG. 12(b) shows a circuit diagram of an embodiment of the sensor shown in FIG. 12(a).
FIG. 12(c) shows the diagram of the output wave of the sensor shown in FIG. 12(b).
Figure 12:
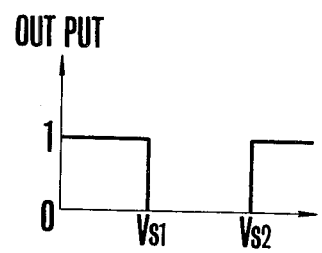

FIG. 12(a) shows a circuit diagram of an embodiment of the signal forming circuit EM shown in FIG. 1. Elements 3-1-3-3 are the sensors for detecting the abnormal operation of the cameras $Ca_1$-$Ca_3$, $FF_{13-1}$-$FF_{13-3}$ the Flip-Flops respectively connected to the sensors 3-1-3-3 so as to be triggered by means of the output of the sensors. Further, the output terminal of the Flip-Flop $FF_{13-1}$-$FF_{13-3}$ is connected to the afore mentioned OR gate $OR_3$-$OR_5$ and at the same time to the OR gate $OR_{13-1}$ and $OR_2$ shown in FIG. 1. $AND_{13-1}$ is the AND gate having input terminal connected to the afore mentioned OR gate $OR_{13-1}$ and the register 5 shown in FIG. 11 and having an output terminal connected to the OR gate $OR_2$ shown in FIG. 1.

FIG. 12(b) shows the circuit diagram of an embodiment of the sensors 3-1-3-3 shown in FIG. 12(a), where PD is a light sensing diode such as photodiode, AMP the operational amplifier having diode $D_{12}$ connected as a feedback element. These circuits element constitute the light measuring amplifier for producing an output of the voltage corresponding to the brightness. $COMP_1$ is the comparison circuit having one input terminal is supplied with the standard voltage Vs and having another input terminal connected to the output of the light measuring amplifier. $COMP_2$ is the comparison circuit having one input terminal supplied with the standard voltage lower than the afore mentioned $Vs_2$ and having another input terminal is connected to the output terminal of the afore mentioned light measuring amplifier. The sensor produces "0" only when the output of the light measuring amplifier is between $Vs_1$ and $Vs_2$, namely only when the brightness is suited for obtaining the proper exposure. Otherwise the sensor produces a "1".

Below, the operation of the signal forming circuit is explained. If the proper exposure can not be obtained due to insufficient or excessive brightness, such condition is detected by means of the sensor 3-1 connected to the camera $Ca_1$ whereby the sensor produces the output "1" as is shown in FIG. 12(c) so as to set the Flip-Flop $FF_{13-1}$. Further, at this time, the output of the sensor 3-1 is delivered to the break-in photographing control circuit 7-1 so that 7-1 produces the output $OUT_1$ as mentioned above. The photographing signal $R_1$ is delivered to the camera $Ca_1$ to carry out the photographing while the data delivered to the register D1R at the time point is printed on the film. Further, when Flip-Flop $FF_{13-1}$ is set, its output is delivered to the OR gate $OR_3$ shown in FIG. 1. Camera $Ca_1$ is brought in the non-operable state by means of the control circuit $M_1$ as mentioned above in such a manner that after this time point only the cameras $Ca_2$ and $Ca_3$ are controlled in a sequential way by means of $M_2$ and $M_3$ to carry out the photographing. Further, the output of $FF_{13-1}$ is delivered to the OR gate $OR_2$ whereby the abnormal operation of the camera $Ca_1$ is recorded in the printer shown in FIG. 1. The above explanation relates to the case of the abnormal operation of only the camera $Ca_1$. It should be noted that, in the case of the abnormal operation of the cameras $Ca_2$ and $Ca_3$, the sequential control by means of $M_2$ and $M_3$ is stopped quite in the same way while the data printing and the recording by the printer are carried out.

Figure 13:
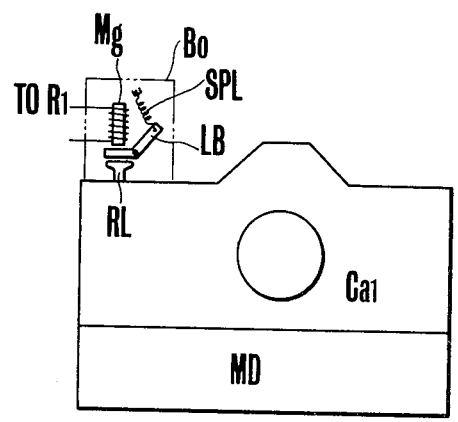
FIG. 13 shows a motor-drive device mounted on the camera shown in FIG. 1.

FIG. 13 shows the camera $Ca_1$ shown in FIG. 1, mounted on the motor drive device MD, whereby RL is the release lever and the part Bo shown in a dotted line is the release device for electro-magnetically releasing the release lever. The release device consists of the magnet Mg with a permanent magnet so designed that normally the lever LB is attracted by the permanent magnet against the spring SPL while the magnet is operated by means of the afore mentioned signal $R_1$ so as to release the attraction of the lever LB whereby the release lever RL is pushed down by means of the lever LB through the spring SPL. As explained above the release signal $R_1$ is produced and the attraction of LB is released in such a manner that the release lever RL urging LB along the counterclockwise direction by means of the spring SPL is continued being pushed down until the signal $R_1$ is extinguished.

In the present embodiment, the still camera is used, however the same control can be obtained even when a motion picture camera is driven by means of the release signal $R_1$.

As explained in detail before, in the case of the control device in accordance with the present invention, the photographing sequence information is stored in the register in such a manner that by means of the information of the photographing sequence such as the photographing period, the photographing time, the photographing frequency and so on is carried out while a desired photographic data is stored in the register means for storing the data to be printed. Thus the data printing means in the camera is operated in accordance with the photographing data stored in the register means for storing the data when the camera is controlled by means of the sequence control circuit and further the ambient conditions are detected in such a manner that when the ambient conditions change beyond a certain determined amount, the camera is operated independently of the sequence control by means of the sequence control circuit. That is, the control device in accordance with the present invention presents various improvements in the aspects of photography discussed in the Summary of the Invention.

What is claimed is:

1. A A photographic system for a camera comprising:
(A) a control device having:
  (a) an information memory circuit for storing information for determining a time interval between camera release operations and for storing information of a number of release operations;
  (b) a control circuit connected to the memory circuit, for forming a release signal at a certain determined time interval in accordance with the time interval information stored in the memory circuit, wherein said control circuit controls the number of release operations to be made in accordance with the number of the release signals produced from the control circuit and the release operation number information stored in the memory circuit;

said camera performing a shutter release operation and the start of an exposure operation in response to the release signal; and (B) a film winding device for winding a film after exposure operation is terminated.

2. A control device for a camera having a release means for performing a release operation in response to a release signal comprising:
   (a) an information memory circuit for storing information for determining a time interval between camera release operations;
   (b) a control circuit connected to the memory circuit, for forming the release signal at a certain determined time interval in accordance with the time interval information stored in the memory circuit;
   (c) a measuring instrument;
   (d) a break-into photography control circuit for detecting a fluctuation in an output of the measuring instrument for producing a detecting output when the output of the measuring instrument fluctuates beyond a certain determined value, whereby the release means is actuated independently of the release signal by means of the detection output.

3. A photographic system for a camera comprising:
   (A) a control device having:
      (a) an information memory circuit having a first register for storing information of a release interval corresponding to an interval time between release actions of said camera and a second register for storing information of a number of photographing operations to be made corresponding to a number of release operations;
      (b) a control circuit connected to said information memory circuit, said control circuit including a first counter circuit connected to said first register, and a second counter circuit connected to said second register, wherein said first counter circuit counts pulses with a certain frequency and produces a pulse when the number of pulses counted by the first counter circuit attains a certain relation with respect to said information stored in said first register, and said second counter circuit counts pulses from the first counter circuit and produces a pulse when the number of pulses counted by the second counter circuit attains a certain relation with respect to said information stored in said second register and said first counter circuit stops to produce a pulse;
      said camera performing a shutter release operation and starting an exposure operation in response to said pulse from the first counter circuit; and
   (B) a film winding device for winding a film after exposure operation is terminated.

4. A control device for a camera comprising:
   (a) an information memory circuit having a first register for storing information of a release interval corresponding to an interval between release actions, a second register for storing information of a release time corresponding to a release operation time, and a third register for storing information of a number of photographing operations to be made corresponding to a number of release actions to be made;
   (b) a control circuit connected to said information memory circuit, said control circuit including a first counter circuit connected to the first register, a second counter circuit connected to the second register, and a third counter circuit connected to the third register, wherein said first counter circuit counts pulses with a certain frequency and produces a pulse when the number of pulses counted by the first counter circuit attains a certain relation with respect to said information stored in said first register, said second counter circuit starts to count a pulse with a certain frequency in response to the pulse from the first counter circuit and produces a pulse when the number of pulses counted by the second counter circuit attains a certain relation with respect to said information stored in the second register, and the third counter circuit counts the number of pulses corresponding to the number of pulses produced by the first counter circuit and produces a pulse when the number of pulses counted by the third counter circuit corresponds to the information of the number of photographing operations stored in the third register and said first counter circuit stops to produce a pulse in response to the pulse from the third counter circuit; and
   (c) gate means for producing a release signal in response to the pulse from said first counter circuit and extinguishes the release signal in response to the pulse from the second counter circuit.

5. A control device for a camera comprising:
   (a) first register means for storing information of a time interval between release operations;
   (b) second register means for storing information of a number of release operations to be made;
   (c) third register means for storing information of a time for which the release is maintained corresponding to a time for which the release operation is continued; and
   (d) a control circuit connected to the first, second and third register means, said circuit including:
      (1) a first counter circuit to count pulses with a certain frequency for producing a release signal at a certain determined cycle in accordance with the time interval information stored in the first register means;
      (2) a second counter circuit to count pulses with a certain frequency in response to the release signal for keeping the release signal for a length of time corresponding to the information corresponding to the time for which the release is maintained which is stored in the third register means; and
      (3) a third counter circuit for counting the number of the release signals from said first counter so as to form a sequence control termination signal when the relationship between said number of release signals and the information of the number of release operations stored in the second register means reaches a certain determined one, said control circuit being designed to stop the operation in response to the sequence control termination signal,
   whereby the time interval between the release operations is controlled in accordance with the information of the time interval which is stored in said first register means, the time for which the release is maintained in accordance with the information of the time for which the release is maintained which is stored in said third register means, and the number of releases in accordance with the information of the number of release operations which is stored in said second register means.

6. A control device according to claim 5, in which said control device includes a fourth register for storing data to be printed, and a printing operation control circuit for producing a print signal in response to the release signal from the first counter circuit and a display circuit to display the content of said fourth register in response to the print signal for printing the displayed data on a film.

7. A control device according to claim 6, in which said device includes a timer for producing an output for a certain length of time in response to said release signal from the first counter circuit following which the printing operation control circuit holds the print signal for a period of time during which an output is emitted from the timer.

8. A control device according to claim 5, in which said control device includes a break-into photography control circuit for producing an output to control the release operation of a camera independently of the release signal from the first counter circuit.

9. A control device according to claim 8, in which said first counter circuit is placed in a non-operable state in response to an output from the break-into photography control circuit.

10. A control device in accordance with claim 5, further comprising a register means for data printing for storing data to be printed and a printing operation control circuit for printing on film the data stored in the register means, said printing operation control circuit being designed to carry out the data printing operation in response to the release signal from said first counter circuit.

11. A control device in accordance with claim 10, wherein the control device includes a timer circuit for controlling the data printing time.

12. A control device
(a) first register means for storing information of a time interval between photographing operations of said camera corresponding to a time interval between release actions;
(b) second register means for storing information of a number of release operations to be made corresponding to the number of release actions to be made;
(c) a first counter circuit for counting pulses with a certain frequency connected to the first register means so as to form a pulse at a certain determined frequency in accordance with the time interval information stored in the first register means;
(d) a second counter circuit connected to the first counter circuit and the second register means, wherein said second counter circuit counts said pulse from said first counter circuit, to control the number of release actions to be made in accordance with the number of pulses produced from the first counter circuit and the information of the release operation number stored in the second register means;
(e) a release device for controlling the release operation in response to the pulses from said first counter;
(f) a measuring instrument;
(g) a circuit having a detector for detecting fluctuation in an output of the measuring instrument to produce a detection output when the output of the measuring instrument fluctuates beyond a certain determined value, whereby by means of the detection output, the release device is operated independently of the pulse from said first counter circuit.

13. A control device for a camera comprising:
(a) a register for storing time interval cycle information corresponding to a time interval between release operations;
(b) a register for storing information of a number of the release operations;
(c) a control circuit for controlling the time interval between release operations and the number of the release operations in accordance with the information stored in said registers;
(d) a sensor for detecting a fluctuation in ambient conditions to produce a detection output when the ambient conditions fluctuate beyond a certain determined value; and
(e) a release device for carrying out a release operation independently of the release operations by means of the control circuit in response to the detection output from the sensor.

14. A control device in accordance with claim 13, wherein said control circuit is designed to be brought into a non-operable state in response to the detection output.

15. A control device for a camera comprising:
(a) first register means for storing information of a time interval corresponding to a time interval between release operations;
(b) second register means for storing information of a number of photographings corresponding to a number of release operations;
(c) a control circuit connected to the first and second register means to form the release signal at a certain determined cycle in accordance with the information of the time interval stored in the first register means, wherein the control circuit becomes non-operative when the number of release signals produced by the control circuit attains a certain relationship with the information of the number of photographings stored in the second register means;
(d) an operation time information memory circuit for storing photographing start and termination information;
(e) a measuring instrument;
(f) an operation start control circuit connected to the operation time information memory circuit and the measuring instrument to provide a start signal when the output of the measuring instrument reaches a value corresponding to the photographing start information, wherein said control circuit operates in response to the start signal; and
(g) an operation stop control circuit connected to the operation time information memory circuit and the measuring instrument to produce an END signal when an output of the measuring instrument reaches a value corresponding to the photographing termination information, the control circuit capable of being brought into the non-operable state in response to the END signal.

16. A control device in accordance with claim 15, wherein the measuring instrument is an electronic clock.

17. A control device for a camera comprising:
(a) a first register for storing a digital value corresponding to a cycle of release operations;
(b) a second register for storing a digital value corresponding to a number of release operations;
(c) a third register for storing a digital value corresponding to a time for which the release signal is being emitted;

(d) a pulse generator for producing pulses at a certain determined cycle;

(e) a first counter for counting pulses from the pulse generator, said counter being connected to the first register to produce an output signal when the number of pulses counted by the first counter reaches a value corresponding to a digital value stored in said first register;

(f) a flip-flop being set in response to the output signal of the first counter to produce the release signal;

(g) a second counter for counting pulses of the pulse generator to produce an output signal when the value counted by the second counter reaches a value corresponding to a digital value of the third register, said second counter starting its counting operation in response to the release signal, and said flip-flop being reset in response to the output from the second counter to extinguish the release signal; and (h) a third counter for counting the release signal, said counter being connected to the second register so as to produce an END signal when the number counted by the third counter reaches a value corresponding to a digital value of the second register while the flip-flop is brought into the non-operable state in response to the END signal.

18. A control device for a camera comprising:

(a) an information memory circuit for storing an information corresponding to a cycle of release operation and information of a number of photographings corresponding to a number of release operations;

(b) a control circuit connected to the information memory circuit, wherein said circuit produces a release signal at a certain determined cycle in accordance with the information corresponding to a cycle of release operation and stops to produce said release signal when the number of release signals produced by the control circuit attains a certain relationship with respect to said photographing number information;

(c) a release device for release operation of a camera, wherein said device performs a release operation in response to the release signal; and (d) a sensor which detects a change in a photographing condition and generates an output when photographing conditions change suddenly, wherein said sensor is connected to said control circuit which stops to provide the release signal in response to the output of the sensor.

19. A control circuit in accordance with claim 18, in which said release device performs a release operation in response to the output of said sensor independently of the release signal from the control circuit.

20. A control device for a camera having a release means for performing a release operation in response to a release signal comprising:

(a) an information memory circuit for storing information for determining a time interval between camera release operations and for storing information of a number of release operations and for storing information of time for which the release is maintained corresponding to a time for which the release operation is continued; and (b) a control circuit connected to the memory circuit, for forming the release signal at a time interval in accordance with the time interval information stored in the memory circuit, wherein said control circuit controls the number of release operations in accordance with the number of the release signals produced by said control circuit and the release operation number information stored in the memory circuit and wherein said control circuit maintains the release signal for a length of time corresponding to the time for which the release operation is continued which is stored in the memory circuit.

21. A control device for a camera having a release means for performing a release operation in response to a release signal comprising:

(a) an information memory circuit for storing information for determining a time interval between camera release operations and for storing information of a number of release operations and for storing information of time for which the release is maintained corresponding to a time for which the release operation is continued; and (b) a control circuit connected to the memory circuit, said control circuit including a counter circuit having a first counter part for counting pulses with a certain frequency, said first counter part producing the release signal when the counted value has a predetermined relation with said time interval information stored in the memory circuit and a second counter part for counting said release signal, said second counter part producing an end signal for terminating the release operation when the counted value has a predetermined relation with said release operation number information stored in the memory circuit and a third counter part for counting pulses with a certain frequency in response to the release signal for keeping the release signal for a length of time corresponding to the time information for which the release operation is continued which is stored in the memory circuit.

* * * * *